United States Patent
Liu et al.

(10) Patent No.: US 10,545,232 B2
(45) Date of Patent: Jan. 28, 2020

(54) SYSTEM AND METHOD FOR RADAR IMAGING USING DISTRIBUTED MOVING PLATFORMS UNDER UNKNOWN POSITION PERTURBATIONS

(71) Applicant: Mitsubishi Electric Research Laboratories, Inc., Cambridge, MA (US)

(72) Inventors: Dehong Liu, Lexington, MA (US); Ulugbek Kamilov, Cambridge, MA (US); Petros Boufounos, Arlington, MA (US)

(*) Notice: Subject to any disclaimer, the term of this patent is extended or adjusted under 35 U.S.C. 154(b) by 659 days.

(21) Appl. No.: 15/245,580

(22) Filed: Aug. 24, 2016

(65) Prior Publication Data
US 2018/0059237 A1     Mar. 1, 2018

(51) Int. Cl.
*G01S 13/90*     (2006.01)

(52) U.S. Cl.
CPC .................. *G01S 13/90* (2013.01)

(58) Field of Classification Search
None
See application file for complete search history.

(56) References Cited

U.S. PATENT DOCUMENTS

| 7,173,560 B2 | 2/2007 | Li et al. | |
| 9,310,477 B1* | 4/2016 | Sampigethaya | ........ G01S 13/91 |
| 2010/0039313 A1* | 2/2010 | Morris | ........ G01S 13/003 |
| | | | 342/25 F |
| 2012/0056772 A1* | 3/2012 | Jaffer | ........ G01S 7/023 |
| | | | 342/99 |
| 2013/0126679 A1* | 5/2013 | Estkowski | ........ G08G 5/0013 |
| | | | 244/190 |
| 2014/0111372 A1* | 4/2014 | Wu | ........ G01S 7/418 |
| | | | 342/146 |

OTHER PUBLICATIONS

Fioranelli, Francesco, et al., Performance Analysis of Centriod and SVD Features for Personnel Recognition Using Multistatic Micro-Doppler, May 2016, IEEE Geoscience and Remote Sensing Letters, vol. 13 No. 5 (Year: 2016).*

(Continued)

*Primary Examiner* — Frank J McGue
(74) *Attorney, Agent, or Firm* — Gennadiy Vinokur; James McAleenan; Hironori Tsukamoto

(57) ABSTRACT

Systems and methods for fusing a radar image in response to radar pulses transmitted to a region of interest (ROI). The method including receiving a set of reflections from a target located in the ROI. Each reflection is recorded by a receiver at a corresponding time and at a corresponding coarse location. Aligning the set of reflections on a time scale using the corresponding coarse locations of the set of distributed receivers to produce a time projection of the set of reflections for the target. Fitting a line into data points formed from radar pulses in the set of reflections. Determining a distance between the fitted line and each data point. Adjusting the coarse position of the set of distributed receivers using the corresponding distance between the fitted line and each data point. Fusing the radar image using the set of reflections received at the adjusted coarse position.

24 Claims, 18 Drawing Sheets

(56) References Cited

OTHER PUBLICATIONS

Xu et al. "Radar Coincidence imaging with array position error." 2015 IEEE International Conference on Signal Processing, Communications and Computing, Sep. 19, 2015, pp. 1-4.

Liu et al. "Sparsity driven radar auto focus imaging under over wavelength position perturbations," 2016 IEEE Sensor Array and Multichannel Signal Processing Workshop, SAM, IEEE Jul. 10, 2016, pp. 1-5.

Liu et al., "coherent distributed array imaging under unknown position perturbations," 2016, 4th International workshop on compressed sensing theory and its applications to radar, sonar and remote sensing, IEEE, Sep. 19, 2016. pp. 105-109.

Candes et al., "Robust uncertainty principles: Exact signal reconstruction from highly incomplete frequency information," IEEE Transactions on Information Theory, vol. 52(2), Feb. 2006.

Baraniuk et al., "Compressive radar imaging," in IEEE Radar Conference, MA, Apr. 2007.

M. A. Herman and T. Strohmer, "High-resolution radar via compressed sensing," IEEE Trans. Signal Process., vol. 57, Jun. 2009.

Potter et al., "Sparsity and compressed sensing in radar imaging," Proceeding of the IEEE, vol. 98, pp. 1006-1020, Jun. 2010.

P.T. Boufounos, D. Liu, H. Mansour, and S. Sahinoglu, "Sparse MIMO architectures for through-the-wall imaging," in IEEE Sensor Array and Multichannel Signal Processing Workshop(SAM), Jun. 2014, pp. 513-516.

D.L. Donoho, Y. Tsaig, I. Drori, and J.-L. Starck, "Sparse solution of underdetermined systems of linear equations by stagewide orthogonal matching pursuit," IEEE Trans. Information Theory, Feb. 2012.

Liu et al., "Random steerable arrays for synthetic aperture imaging," ICASSP, 2013.

A. Beck and M. Teboulle, "Fast gradient-based algorithm for constrained total variation image denoising and deblurring problems," IEEE Trans. Image Process., vol. 18, No. 11, pp. 2419-2434, Nov. 2009.

M. Tao and J. Yang, "Alternating direction algorithms for total variation deconvolution in image reconstruction," TR 0918, Department of Mathematics, Nanjing University, 2009.

Boyd et al, "Distributed optimization and statistical learning via the alternating direction method of multipliers," Foundations and Trends in Machine Learning, vol. 3, No. 1, pp. 1-22, 2011.

\* cited by examiner

SYSTEM AND METHOD FOR RADAR IMAGING USING DISTRIBUTED MOVING PLATFORMS UNDER UNKNOWN POSITION PERTURBATIONS

FIELD

The present disclosure relates generally to radar systems, and more particularly radar imaging using distributed moving radar platforms under unknown position perturbations.

BACKGROUND

Some challenges in radar imaging using distributed sensing platforms is being able to identify locations of platforms due to inaccurate calibration or various position perturbations. For example, for a vehicle mounted radar system, as the vehicle is moving along some predesigned trajectory, position perturbations are introduced due to non-smooth road surface or varying driving velocity and direction. These position perturbations can be as large as several wavelengths of the radar center frequency. Although modern navigation systems such as the Global Positioning System (GPS) can measure positions, the possible position errors due to position perturbations are beyond the scope of high-resolution distributed radar imaging. Therefore, there is a need for radar imaging systems and methods for distributed arrays that can perform autofocusing in order to compensate for unknown over-wavelength position perturbations.

SUMMARY

Embodiments of the present disclosure relate to systems and methods for radar imaging using distributed arrays of moving radar platforms that perform autofocusing in order to compensate for unknown position perturbations.

Some embodiments of the present disclosure relate to systems and methods for radar imaging using distributed arrays of moving radar platforms for detecting targets in a region of interest (ROI), where the radar sensors of the moving radar platforms are perturbed with location errors. The present disclosure provides for an improved radar imaging performance, based on data coherence and compressive sensing that simultaneously compensates for position-induced phase errors and performs focused imaging, among other things.

Specifically, the systems and methods of the present disclosure assume one transmitting/receiving radar platform and multiple receiving radar platforms are moving towards the ROI with position perturbations, so as to detect targets inside the ROI. The multiple distributed arrays of moving radar platforms receive reflections reflected by the targets located in the ROI. The multiple arrays of moving radar platforms are uniform linear arrays randomly distributed with different locations and orientations at a same side of the area of interest. Despite the image resolution of each array is low, due to the small aperture size, a high resolution is achieved by combining signals received by all distributed arrays using a sparsity-driven imaging method if the positions of the distributed radar platforms are known exactly. However, due to inaccurate positioning and motion errors, the actual multiple arrays of moving radar platforms positions are perturbed up to several times the central radar wavelength, causing out-of-focus imaging results if the position perturbations are not well compensated.

Based upon a realization of making an assumption of a sparse scene, auto-focus imaging of the sparse scene can be realized iteratively by solving a series of optimization problems for compensating position-induced phase errors, exploiting target signatures, and estimating antenna positions. Specifically, in order to improve the imaging performance, the auto-focusing systems and methods are based on position error correction by exploiting data coherence and the spatial sparsity of the imaged area to concurrently perform focused imaging and estimate unknown antenna positions.

Because of the above realizations the present disclosure exhibits significant advantages in dealing with antenna array with position errors up to several wavelengths of the radar center frequency, taking antenna radiation pattern and target signature into consideration. Imaging results with simulated noisy data demonstrate that the systems and methods of the present disclosure significantly improved performance in imaging localized targets with only several iterations. In particular, the present autofocusing systems and methods form sharp images of targets situated in the ROI, even for position errors that are ten wavelengths large.

According to an embodiment of the present disclosure, a method for fusing a radar image in response to radar pulses transmitted to a region of interest (ROI). A transmitter transmits the radar pulses toward the ROI and a set of distributed receivers to receive a set of reflections from the ROI. The method including receiving the set of reflections from at least one target located in the ROI, each reflection is recorded by a receiver from the set of distributed receivers at a corresponding time and at a corresponding coarse location. Aligning the set of reflections on a time scale using the corresponding coarse locations of the set of distributed receivers to produce a time projection of the set of reflections for the at least one target. Fitting a line into data points formed from radar pulses in the set of reflections received from the set of distributed receivers. Determining a distance between the fitted line and each data point. Adjusting the coarse position of the set of distributed receivers using the corresponding distance between the fitted line and each data point. Finally, fusing the radar image using the set of reflections received at the adjusted coarse position of the set of distributed receivers, wherein steps of the method are performed by a processor.

According to another embodiment of the present disclosure, a method a non-transitory computer readable storage medium embodied thereon a program executable by a processor for performing a method. The method for fusing a radar image in response to radar pulses transmitted to a ROI. A transmitter transmits the radar pulses toward the ROI and a set of distributed receivers to receive a set of reflections from the ROI. The method including storing, by the processor, the set of reflections received from at least one target located in the ROI. Wherein each reflection is recorded by a receiver from the set of distributed receivers at a corresponding time and at a corresponding coarse location. Aligning, by the processor, the set of reflections on a time scale using the corresponding coarse locations of the set of distributed receivers to produce a time projection of the set of reflections for the at least one target. Fitting, by the processor, a line into data points formed from radar pulses in the set of reflections received from the set of distributed receivers. Determining, by the processor, a distance between the fitted line and each data point. Adjusting, by the processor, the coarse position of the set of distributed receivers using the corresponding distance between the fitted line and each data point. Finally, fusing, by the processor, the radar image using the set of reflections received at the adjusted coarse position of the set of distributed receivers.

According to another embodiment of the present disclosure, a system for fusing a radar image in response to radar pulses transmitted to a region of interest (ROI). A transmitter transmits the radar pulses toward the ROI. The system including a set of distributed receivers to receive a set of reflections from the ROI corresponding to the transmitted radar pulses. A processor operatively connected to a memory and in communication with the set of distributed receivers. The processor is configured to: receive the set of reflections from at least one target located in the ROI, each reflection is recorded by a receiver from the set of distributed receivers at a corresponding time and at a corresponding coarse location. The processor aligns the set of reflections on a time scale using the corresponding coarse locations of the set of distributed receivers to produce a time projection of the set of reflections for the at least one target. The processor fits a line into data points formed from radar pulses in the set of reflections received from the set of distributed receivers. The processor determines a distance between the fitted line and each data point. The processor adjusts the coarse position of the set of distributed receivers using the corresponding distance between the fitted line and each data point. Finally, the processor fuses the radar image using the set of reflections received at the adjusted coarse position of the set of distributed receivers.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 1C is a schematic illustrating step 170 of an aligning in time of the set of radar reflections, and step 180 regarding line $T_0$ fitted into pulses corresponding to the same target that the set of reflections are aligned in time specific to coarse positions of the set of receivers, according to embodiments of the present disclosure;

FIG. 1D is a schematic illustrating positions of the set of receivers that have been formed in the virtual array, according to embodiments of the present disclosure;

FIG. 1F is showing that the method can fuse the radar image from set of reflections using the adjusted positions of the receivers on the virtual array upon computed deviations of the set of receivers and using the deviations of the set of receivers to position the reflections of the set of receivers in a virtual array, according to embodiments of the present disclosure;

Figure 1A:
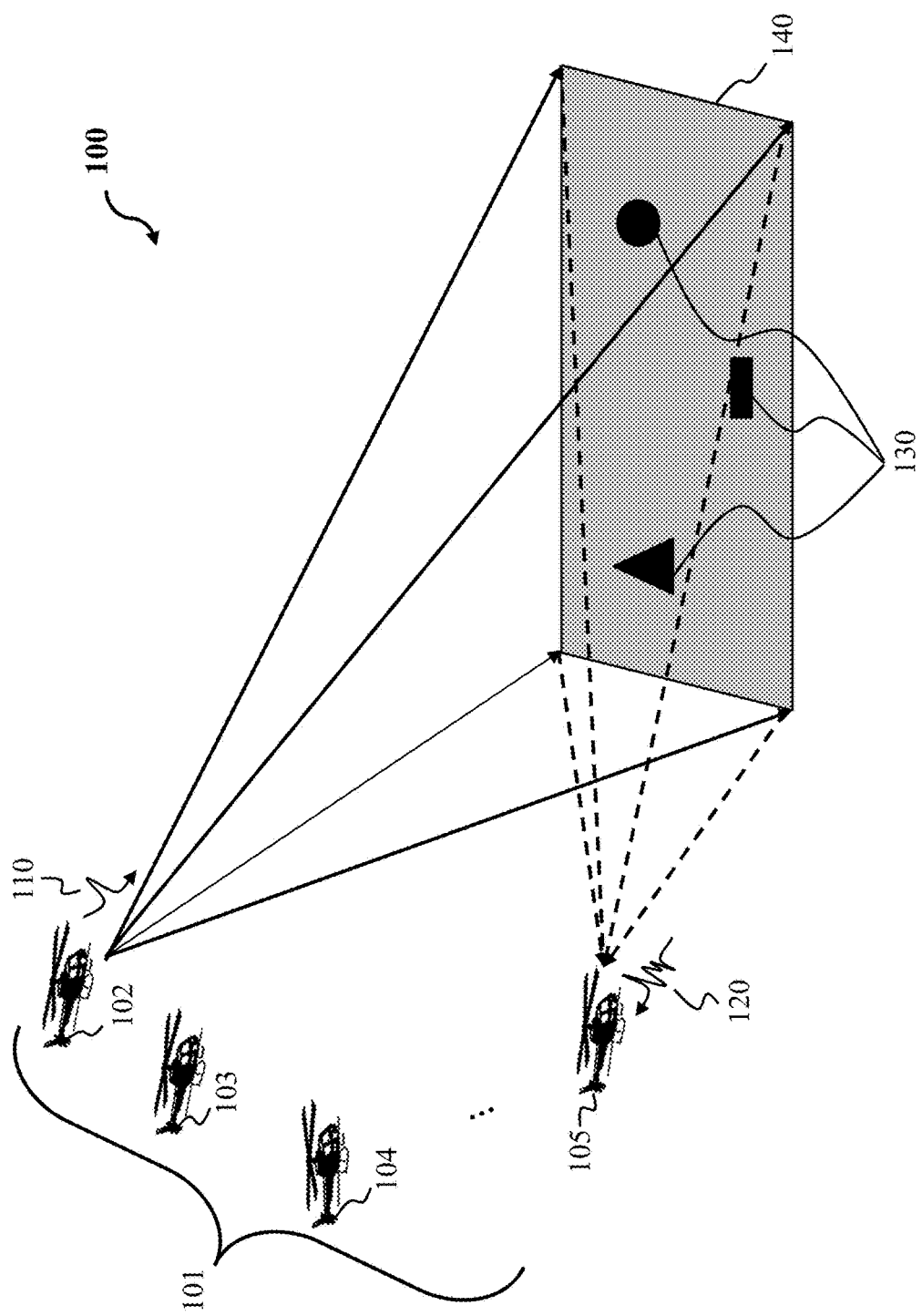
FIG. 1A is a schematic illustrating a distributed moving radar imaging system having distributed arrays of moving radar platforms for detecting targets in a Region of Interest (ROI), according to embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

The embodiments of our present disclosure include coherent distributed radar imaging by allowing location ambiguities, and on autofocusing for a single sensor array by distributed sensing with multiple sensors. In particular, a multi-static radar imaging approach where one transmitting/receiving radar platform and multiple receiving radar platforms are moving towards a region of interest (ROI) with position perturbations. The embodiments of our present disclosure detect targets inside the ROI. Due to inaccurate positioning and motion errors, the actual array positions are perturbed up to several times a central radar wavelength. Although the image resolution of each sensor array may be low due to its small aperture size, a high-resolution image can be formed by jointly processing the outputs of all distributed arrays with well-compensated position errors. The embodiments of our present disclosure assume a sparse scene, and is realized iteratively by solving series of optimization problems for compensating position-induced phase errors, exploiting target signatures, and estimating antenna positions.

The embodiments of our present disclosure also provide for auto-focus radar imaging for generating a radar image of targets situated in an area of interest using a single moving transmit radar platform or combination transmitter/receiver along with multiple spatially distributed moving radar receiver platforms or receivers. The moving radar receivers are perturbed with unknown position errors up to several radar wavelengths.

Distributed Sensing System

FIG. 1A is a schematic illustrating a distributed moving radar imaging system 100 having distributed arrays of moving radar platforms 101 for detecting targets 130 in a region of interest (ROI) 140, according to embodiments of the present disclosure. In particular, the distributed radar imaging system 100, can be an airborne platform or vehicle mounted platform, etc, that includes at least one moving transmit/receive platform or transmitter/receiver 102, and a set of M distributed moving similar receiver platforms or receivers 103, 104, 105. It is contemplated that the set of M distributed receivers may be five or more, 10 or more or 20 or more. Radar pulses 110 are transmitted from the at least one transmitter/receiver 102, to illuminate targets 130 situated in an area of interest or region of interest (ROI) 140, and the corresponding reflected radar reflections 120 are recorded by the multiple distributed receivers 102, 103, 104 and 105. The reflections 120 can be characterized as a weighted combination of delayed pulses, where complex weights depend on specific target reflectivities and antenna patterns. Given the pulses and reflections, radar images can be generated in a range-azimuth plane according to corresponding weights and delays. The azimuth resolution of the radar images depends on a size of an array aperture, and a range resolution depends on a bandwidth of the pulses.

Figure 1B:
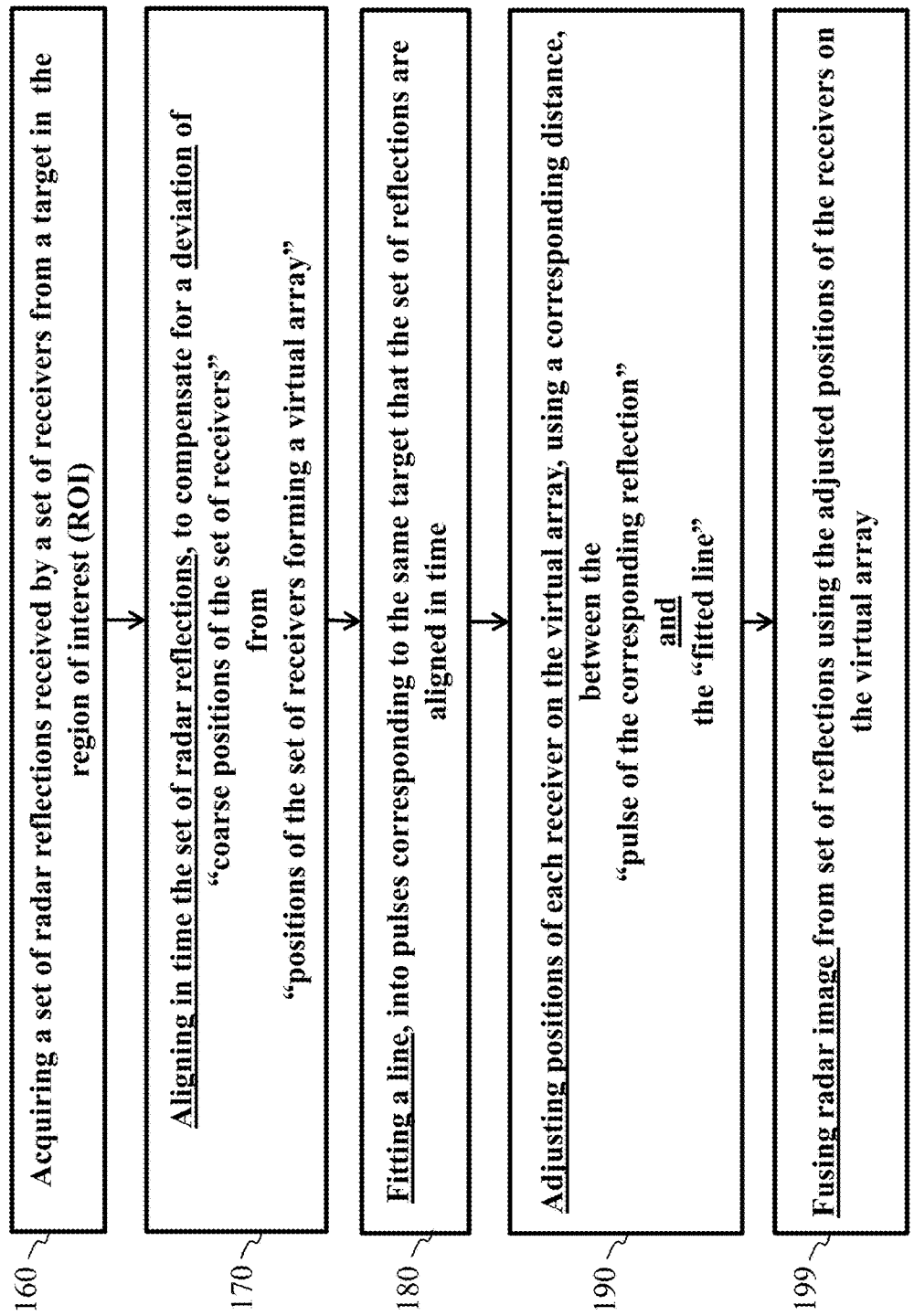
FIG. 1B is a block diagram illustrating steps of a method, according to embodiments of the present disclosure.

FIG. 1B is a block diagram illustrating steps of a method, according to embodiments of the present disclosure. The method includes step 160 of acquiring a set of radar reflections received by a set of receivers from a target in the region of interest (ROI). The set of radar reflections correspond to a transmitted radar signal from a transmitter directed toward the ROI. The set of radar reflections or reflections can be stored in a memory of processor for each receiver and communicated to a central controller for processing.

Step 170 of FIG. 1B includes aligning in time the set of radar reflections, to compensate for a deviation of coarse positions of the set of receivers from positions of the set of receivers forming a virtual array. The coarse positions of the set of receivers are given by real-time GPS signals or by pre-designed stationary positions or moving trajectories. The radar receivers can be stationary or moving along a pre-designed trajectory, and the effective position of each radar receiver where pulse reflections are received forms a virtual array. The virtual arrays are positioned at the same side of the area of interest, where targets are situated. The deviation is determined by subtracting the "coarse position of each receiver in the set of receivers" from the position of each receiver in the set of receivers forming the virtual array. The position deviation is caused by calibration error of stationary positions, or inaccurate GPS. If the deviation, which can be as large as several radar central frequency wavelengths, is not well compensated, the generated radar image will be out of focus. If the deviation is well compensated, the subtraction of the receiver course position from the receiver virtual array position should be zero and the corresponding fused radar image is well focused. With proper distance compensation, the radar reflections are aligned in time such that they can add up spatially at the target position to form a focused image of the target in radar imaging process.

Step 180 of FIG. 1B includes fitting a line into pulses corresponding to the same target that the set of reflections are aligned in time. The fitting line is determined by GPS positions or predesigned positions assuming that the average of position errors is zero.

Step 190 of FIG. 1B includes adjusting positions of each receiver on the virtual array, using a corresponding distance, between the "pulse of the corresponding reflection" and the "fitted line". The corresponding distance shows how much the propagation distance of the transmitted radar pulse, i.e., the total distance from the transmitter to the target and back to the receiver, is different from the coarse located transmitter to the target and back to the coarse located receiver.

Step 199 of FIG. 1B includes fusing the radar image from set of reflections using the adjusted positions of the receivers on the virtual array. For each transmitter-receiver pair, a radar image is generated by delay-and-sum radar imaging using the adjusted positions. The fused radar image is generated by coherently sum all radar images of all possible transmitter-receiver pairs.

Figure 1D:
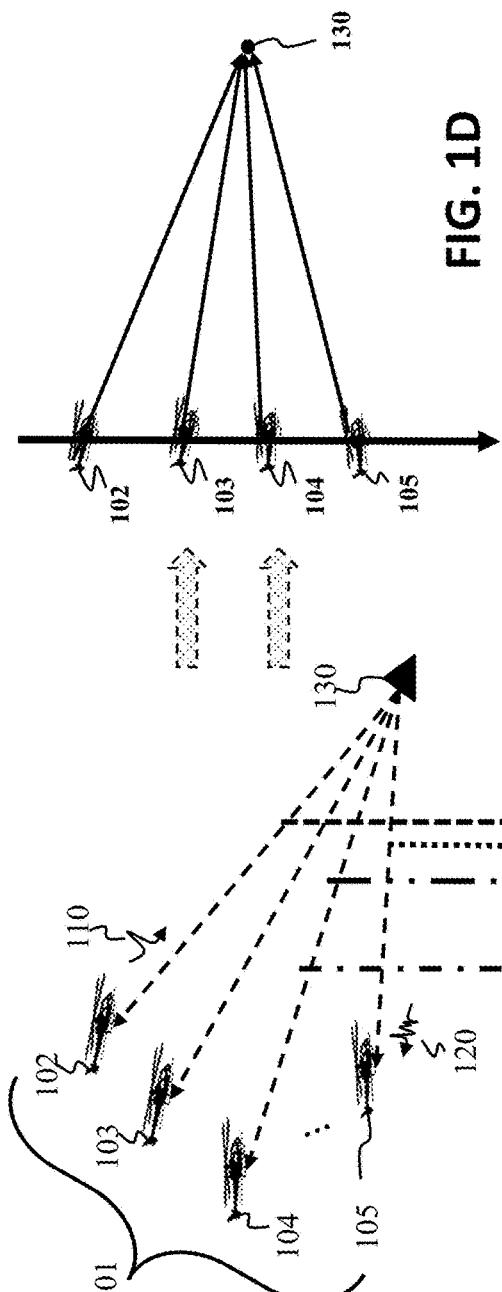
FIG. 1D refers to step 170 and step 180 of FIG. 1B.
Figure 1C:
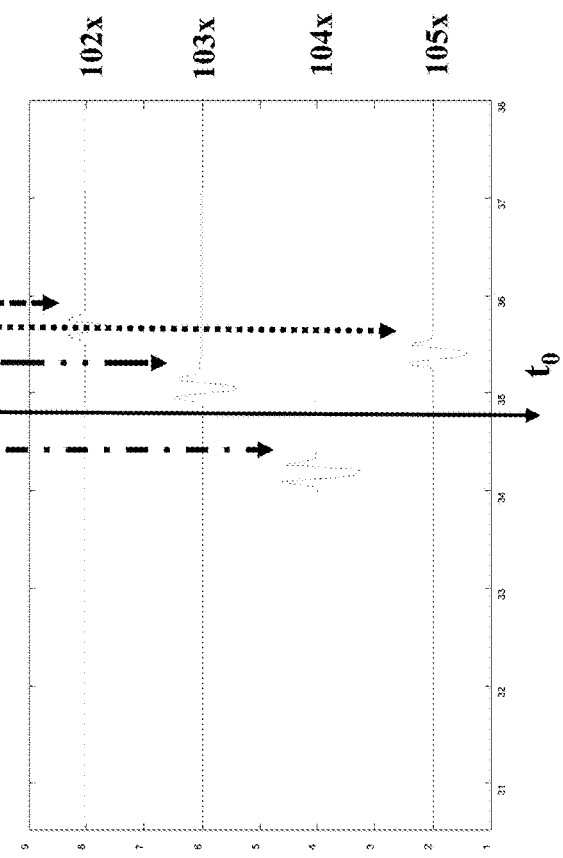
FIG. 1C refers to step 170 and step 180 of FIG. 1B.

FIG. 1C and FIG. 1D are schematics illustrating step 170 and step 180 of FIG. 1B. FIG. 1C is a schematic of step 170 of FIG. 1B illustrating the aligning in time of the set of radar reflections according to their coarse positions of the set of receivers 102$x$, 103$x$, 104$x$, 105$x$, so as to later determine a deviation of coarse positions of the set of receivers from positions of the set of receivers forming a virtual array.

FIG. 1D is a schematic illustrating step 180 of FIG. 1B. FIG. 1D shows line $T_0$ is fitted into pulses corresponding to the same target that the set of reflections 102$x$, 103$x$, 104$x$, 105$x$ are aligned in time. The fitting line is determined by GPS positions or predesigned positions assuming that the average of position errors is zero.

Figure 1E:
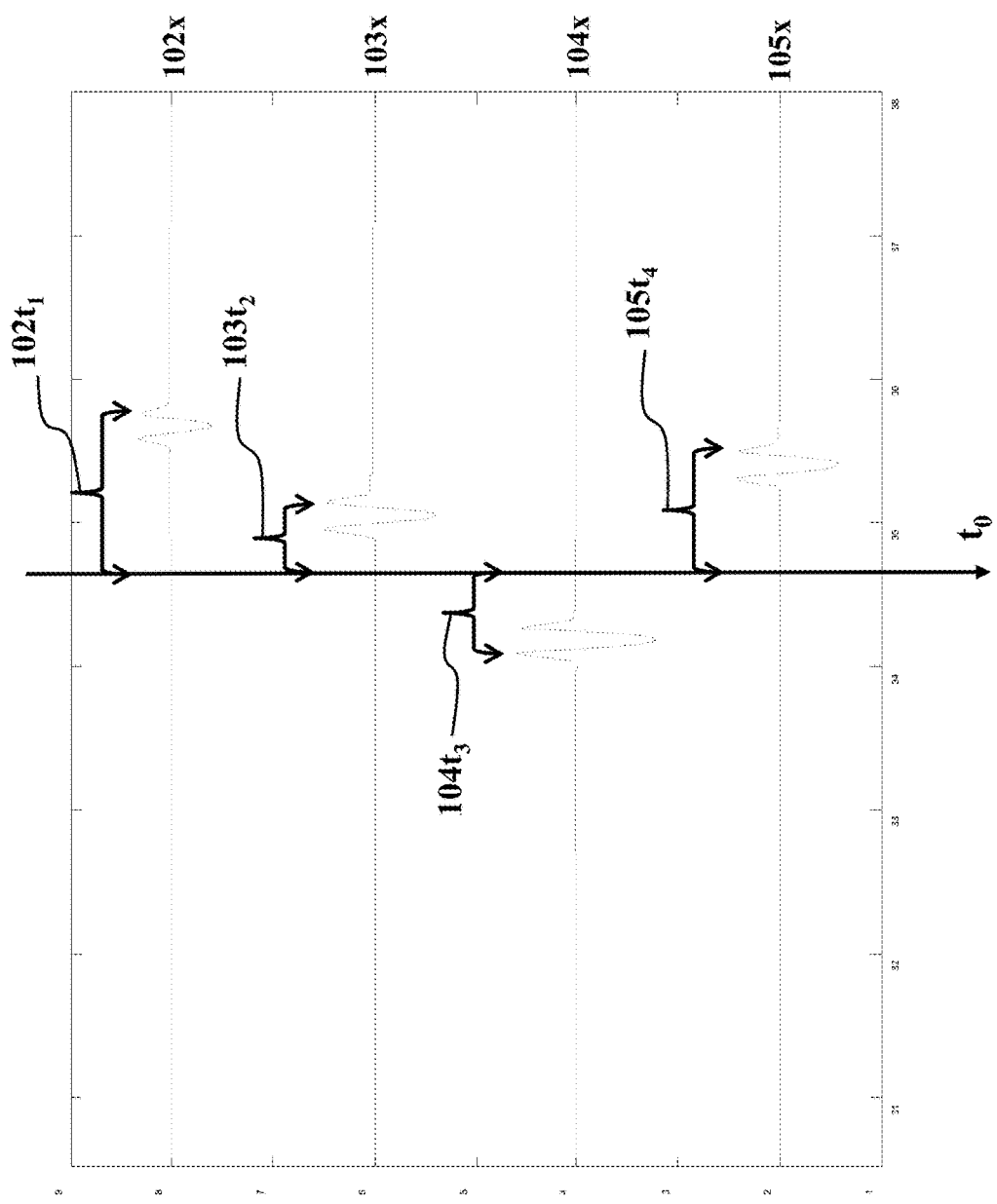
FIG. 1E refers step 180 of FIG. 1B, FIG, and 1E is a schematic illustrating adjusting positions of each receiver for the virtual array, using a corresponding distance, between the "pulse of the corresponding reflection" and the "fitted line" $T_0$, according to embodiments of the present disclosure.

FIG. 1E is a schematic illustrating step 190 of FIG. 1B. FIG. 1E is a schematic illustrating adjusting positions of each receiver 102$t_1$, 103$t_2$, 104$t_3$, 105$t_4$ for the virtual array, using a corresponding distance, between the "pulse of the corresponding reflection" and the "fitted line" $T_0$. As noted above, the reason each receiver position is adjusted on the virtual array is because the corresponding distance shows how much the propagation distance of the transmitted radar pulse, i.e., the total distance from the transmitter to the target and back to the receiver, is different from the coarse located transmitter to the target and back to the coarse located receiver.

Figure 1F:
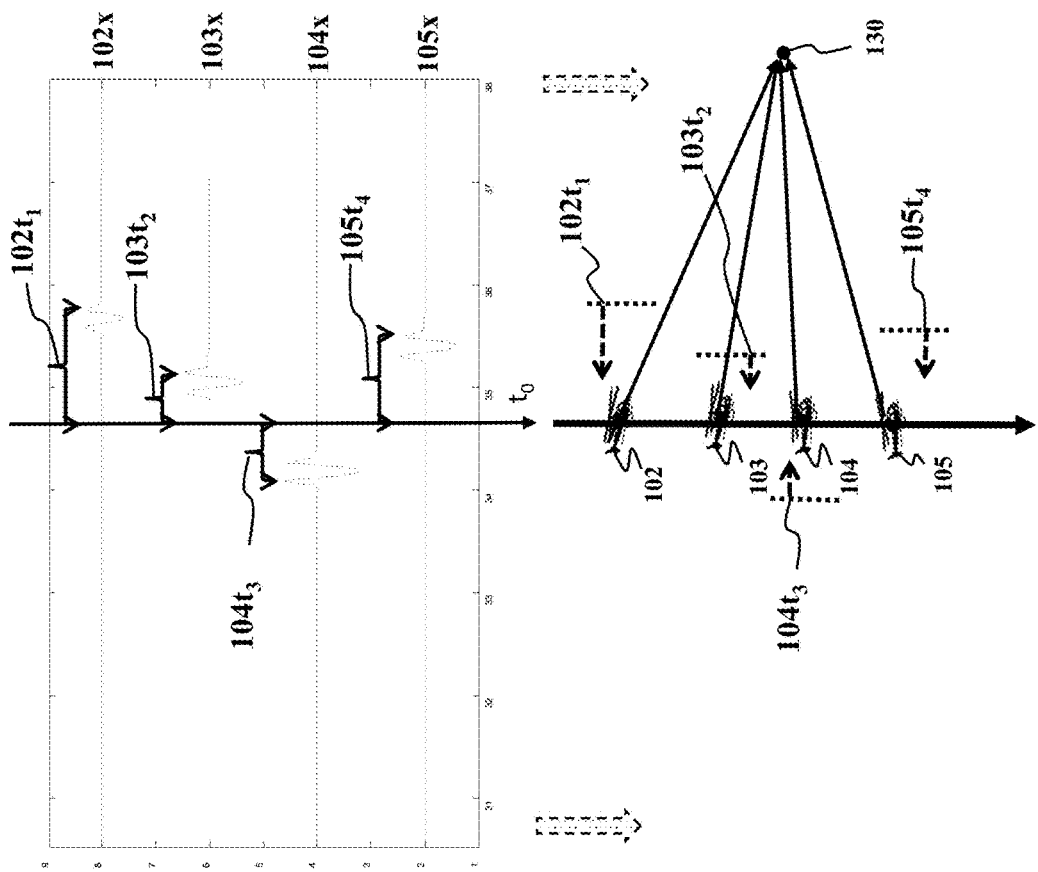
FIG. 1F refers to step 199 of FIG. 1B.

FIG. 1F refers to step 199 of FIG. 1B. FIG. 1F is illustrating that the method can fuse the radar image from the set of reflections using the adjusted positions of the set of receivers on the virtual array upon computing deviations (or adjustments) of the set of receivers, and using the deviations of the set of receivers 102$t_1$, 103$t_2$, 104$t_3$, 105$t_4$ to position the reflections of the set of receivers 102$x$, 103$x$, 104$x$, 105$x$ to the fitted line.

Figure 2:
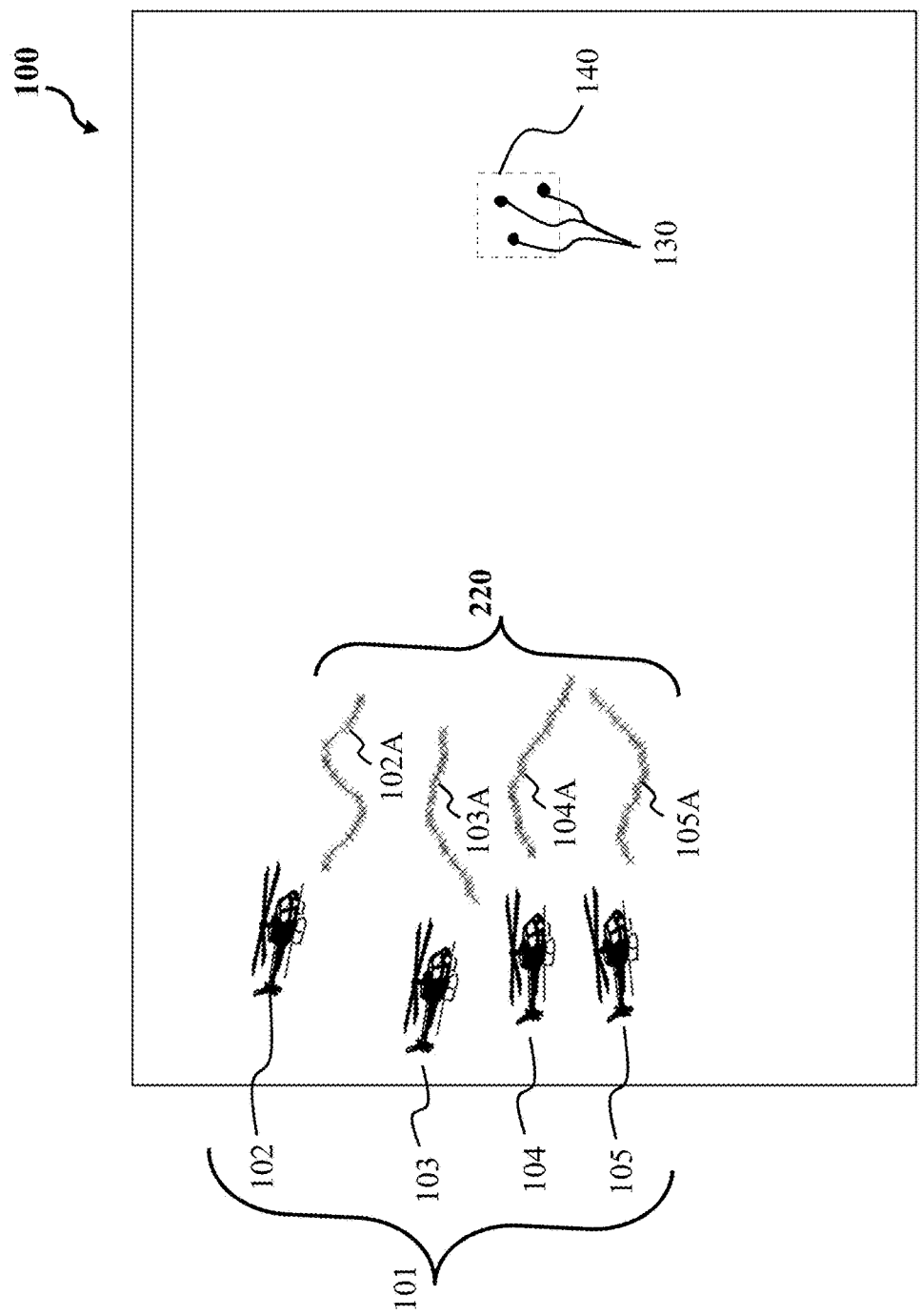
FIG. 2 is a schematic illustrating a distributed moving radar imaging system showing the emitted radar pulses emitted toward the ROI, according to embodiments of the present disclosure.

FIG. 2 is a schematic illustrating a distributed moving radar imaging system 100 of FIG. 1A. FIG. 2 shows the radar receivers receiving radar pulse reflections 102A, 103A, 104A, 105A, that form the virtual array 220. The radar pulse reflections are from emitted radar pulses from a transmitter toward the ROI and reflected from the ROI toward the receivers to form the virtual array 220 of receivers. The distributed arrays of moving radar platforms 101 includes at least one radar platform having an antenna cell which is connected to a radar transmitter 102 that generates the radar pulses toward the ROI. As noted above, the radar transmitter 102 is combined with a receiver 102. The radar receivers 102, 103, 104, 105 acquire reflections reflected by targets 130 in the area of interest (ROI) 140.

Still referring to FIG. 2, the radar receivers 102, 103, 104, 105 are moving along a pre-designed trajectory, and the effective position of each radar receiver where the pulse reflections are received 102A, 103A, 104A, 105A, forms the virtual array 220 of a set of $N_m$ (m=1, ..., M) elements. The virtual arrays 220 are positioned at the same side of the area of interest 140, where targets 130 are situated. The radar receivers 102, 103, 104, 105 are perturbed with random position errors greater than the radar source pulse center wavelength, but within a predetermined range. The multiple radar receivers 102, 103, 104, 105 form multiple distributed non-uniform arrays.

Figure 3A:
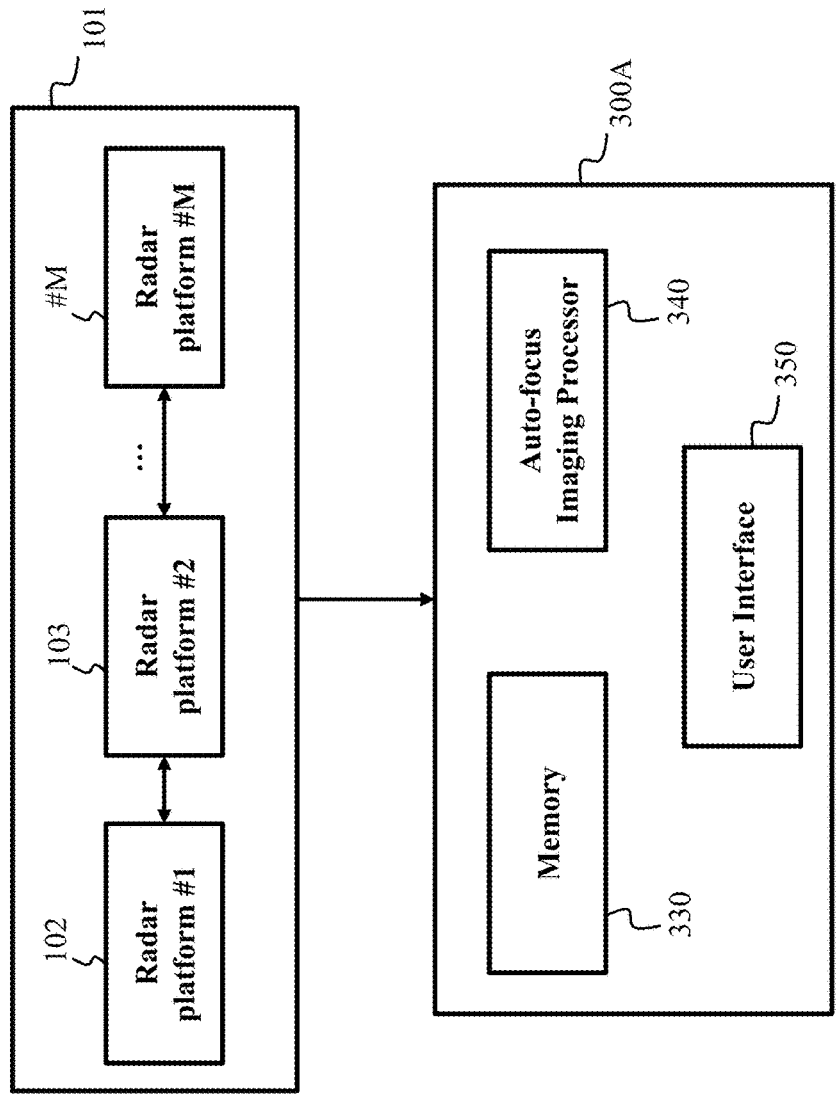
FIG. 3A is a block diagram of a computer system of the distributed radar imaging system showing synchronized radar platforms that communicate to each other and store collected data in a memory that is processed by an autofocus imaging processor, according to embodiments of the present disclosure.

FIG. 3A is a block diagram of the distributed radar imaging system showing radar platforms 101 that communicate to each other and are in communication with a computer 300A. The radar platforms 101 are synchronized and can store collected data in a memory 330 that is processed by an auto-focus imaging processor 340 of the computer 300A. The auto-focus imaging processor 340 can perform the radar imaging method to produce an auto-focused high resolution two-dimensional (2D) radar image. The imaging result can be shown in an user interface 350 of the computer 300A.

Figure 3B:
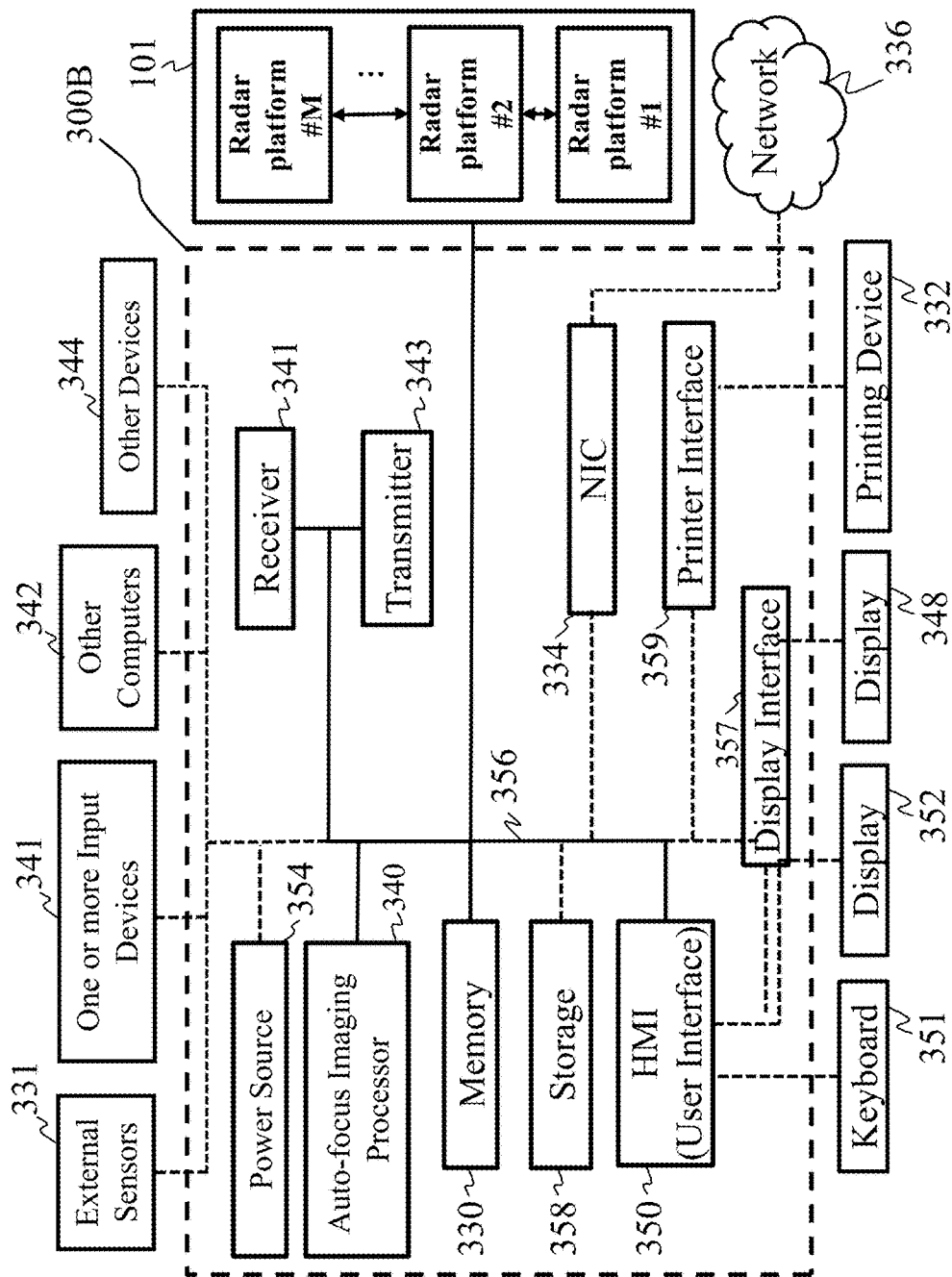
FIG. 3B is a block diagram of a computer system of the distributed radar imaging system contemplated by the present disclosure, in accordance with some embodiments of the present disclosure.

FIG. 3B is a block diagram of a computer system of the distributed radar imaging system contemplated by the present disclosure, in accordance with some embodiments of the present disclosure. The computer system 300B is in communication with the synchronized radar platforms 101 and can store the collected data in the memory 330 that is processed by the auto-focus imaging processor 340 of the computer 300B. The computer system 300B includes a human machine interface or user interface 350 that can connect the computer system to a keyboard 351 and display device 352. The computer system 300B can be linked through the bus 356 to a display interface 357 adapted to connect the system 300B to a display device 348, wherein the display device 348 can include a computer monitor, camera, television, projector, or mobile device, among others.

The computer system 300B can include a power source 354, depending upon the application the power source may be optionally located outside of the computer system. The auto-focus imaging processor 340 maybe one or more processors that can be configured to execute stored instructions, as well as be in communication with the memory 330 that stores instructions that are executable by the auto-focus imaging processor 340. The auto-focus imaging processor 340 can be a single core processor, a multi-core processor, a computing cluster, or any number of other configurations. The auto-focus imaging processor 340 is connected through a bus 356 to one or more input and output devices. The memory 330 can include random access memory (RAM), read only memory (ROM), flash memory, or any other suitable memory systems.

Still referring to FIG. 3B, the computer system 300B can also include a storage device 358 adapted to store supplementary data and/or software modules used by the auto-focus imaging processor 340. For example, the storage device 358 can store historical data relating to predesigned radar platform trajectories, radar operating frequency bandwidth, transmitted waveform, estimated signal-to-noise ratio, image data relating to target recognition, imaging results using simulated noisy data with different methods dealing with position errors, among other things. The storage device 358 can include a hard drive, an optical drive, a thumb-drive, an array of drives, or any combinations thereof.

Still referring to FIG. 3B, a printer interface 359 can also be connected to the computer system 300B through the bus 356 and adapted to connect the computer system 300B to a printing device 332, wherein the printing device 332 can include a liquid inkjet printer, solid ink printer, large-scale commercial printer, thermal printer, UV printer, or dye-sublimation printer, among others. A network interface controller (NIC) 334 is adapted to connect the computer system 300B through the bus 356 to a network 336. The image data or related image data, among other things, can be rendered on a display device, imaging device, and/or printing device via the network 336.

Still referring to FIG. 3B, the image data or related image data, among other things, can be transmitted over a communication channel of the network 236, and/or stored within the computer's storage system 358 for storage and/or further processing. Further, the image data or related image data may be received wirelessly or wire from a receiver 341 or transmitted via a transmitter 343 wirelessly or wire, the receiver 341 and transmitter 343 are both connected to the computer system 300B through the bus 356.

The computer system 300B may be connected to external sensors 331, one or more input devices 341, other computers 342 and other devices 344. The external sensors 331 may include motion sensors, inertial sensors, a type of measuring sensor, etc. The external sensors 231 may include sensors for, speed, direction, air flow, distance to an object or location, weather conditions, etc. The input devices 341 can include, for example, a keyboard, a scanner, a microphone, a stylus, a touch sensitive pad or display.

Compressive Sensing Based Distributed Array Imaging Method

Figure 4:
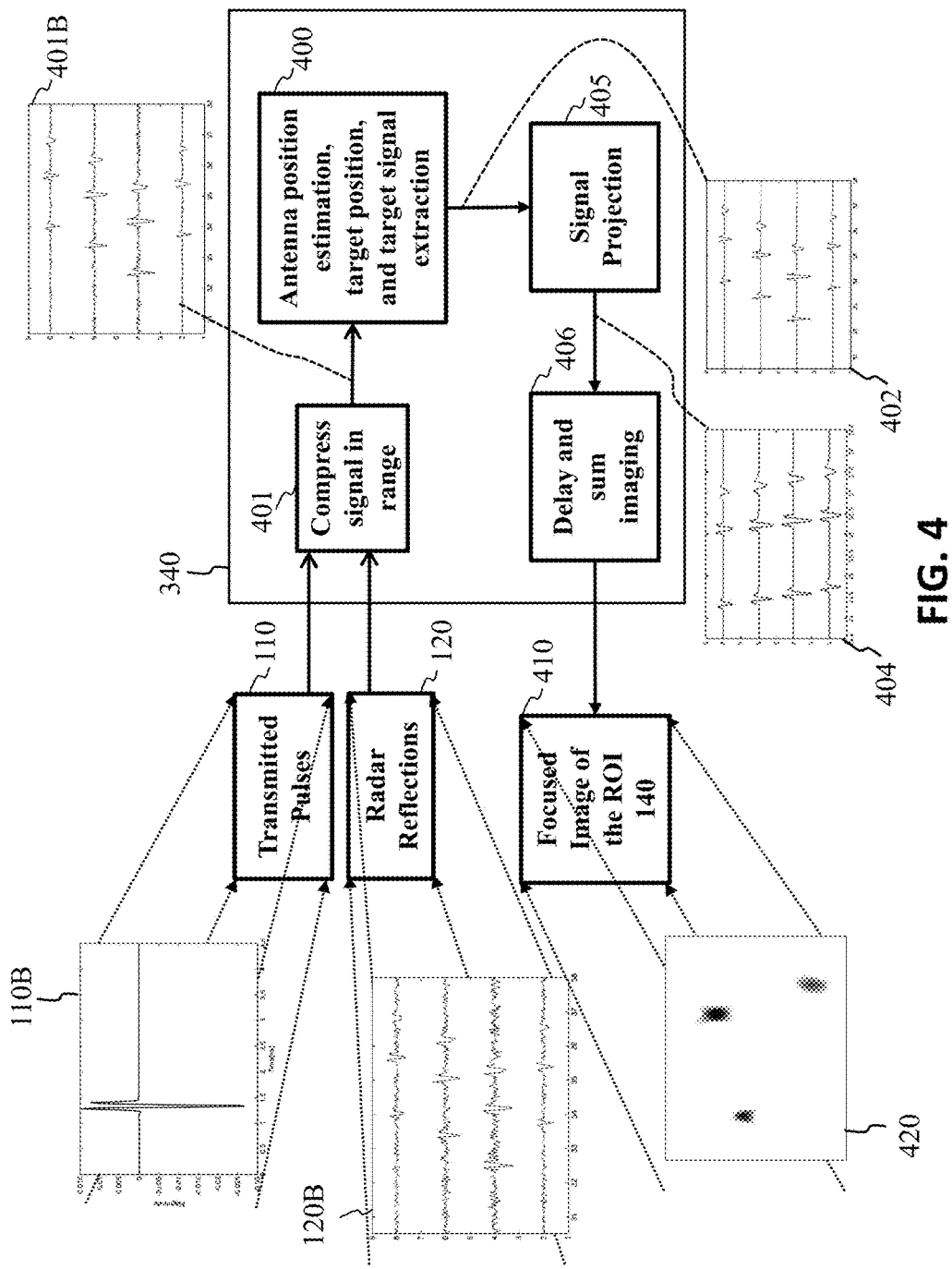
FIG. 4 is a block diagram of a data coherence and sparsity driven distributed array imaging method, according to embodiments of the present disclosure.

FIG. 4 illustrates radar reflections in block 120 collected by distributed platforms incorporated with transmitted pulses in block 110, such that the radar reflections 120 are representative of graph 120B and the transmitted pulses 110 are representative of graph 110B. The radar reflections 120 collected by distributed platforms incorporated with transmitted pulses 110 are processed using iterative sparsity-driven procedures with data coherence analysis in block 400 (see FIGS. 5A-5D regarding the data coherence analysis block 400).

The first step is to compress in block 401, the received reflections 120 using the transmitted pulse 110, and initialize the compressed reflections as input of block 400. The compressed received reflections 120 in block 401 are shown in graph 401B as the output of block 401.

Figure 5A:
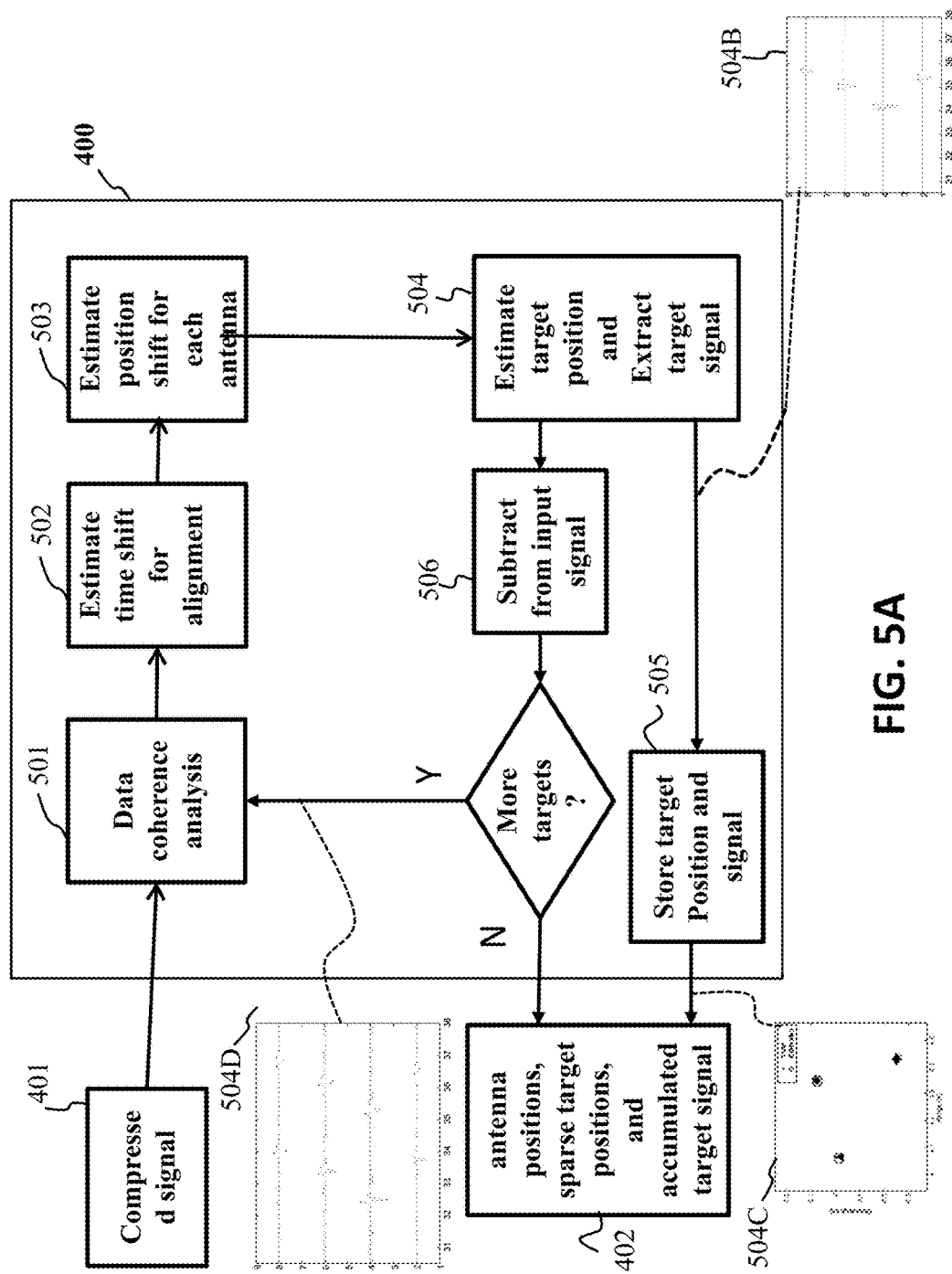
FIG. 5A is a block diagram of an iterative method of block 400 of FIG. 4 to extract target signature, according to embodiments of the present disclosure.

FIG. 5A to FIG. 5D refer to the steps of block 400 of FIG. 4. For example, block 501 of FIG. 5A illustrates the second step that performs data coherence analysis to align signals using cross-correlation such that signals are coherent to each to the maximum extent.

Figure 5B:
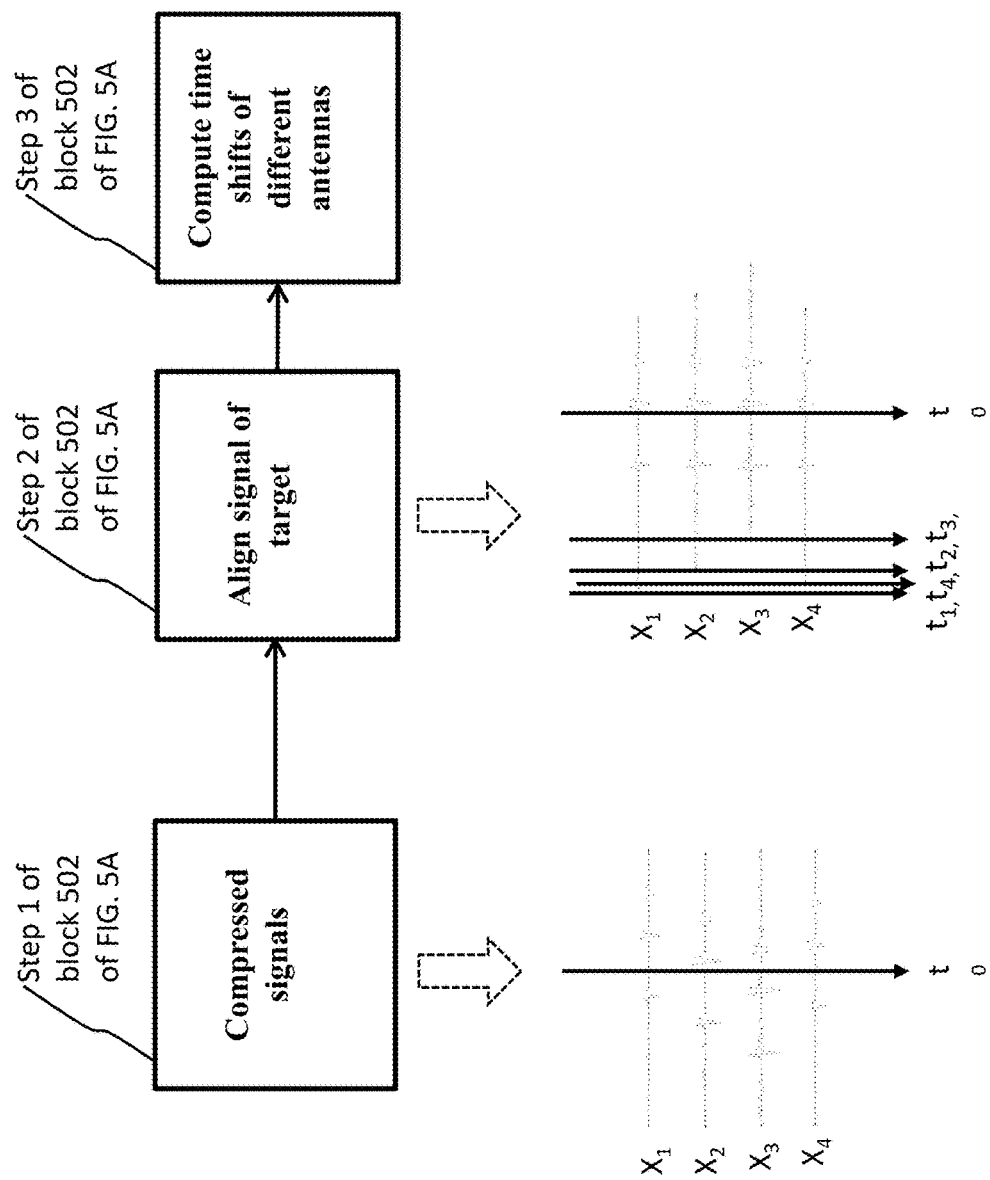
FIG. 5B is a block diagram of step 502 of the iterative method of block 400 of FIG. 5A that includes details of estimating time shift, according to embodiments of the present disclosure.
Figure 5C:
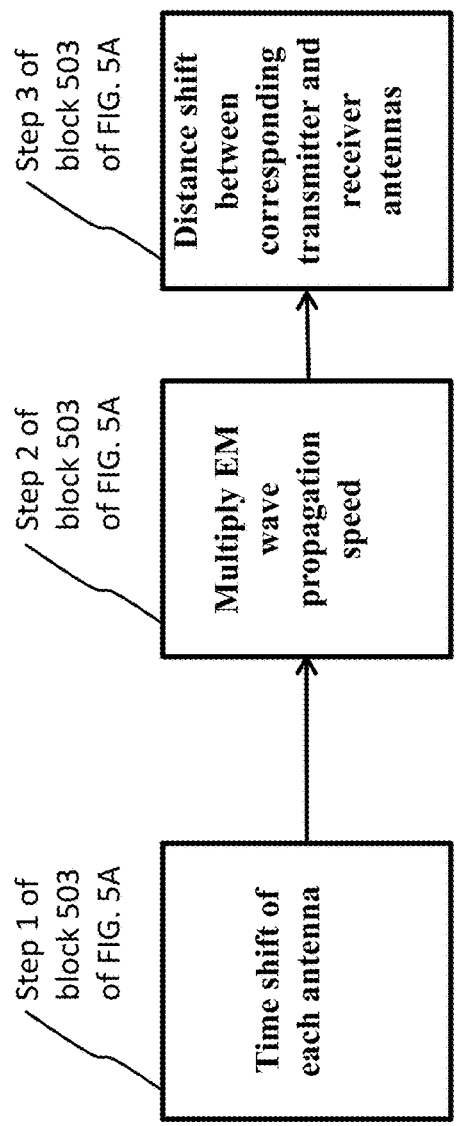
FIG. 5C is a block diagram of step 503 of the iterative method of block 400 of FIG. 5A that includes details of estimating propagation distance between antennas and targets, i.e. the estimated position shift for each antenna, according to embodiments of the present disclosure.

FIG. 5B refers the steps of block 502 of FIG. 5A to compute time shifts of different antennas according to data coherence. FIG. 5C refers the steps of computing distance shift between corresponding transmitter and receiver antennas.

Figure 5D:
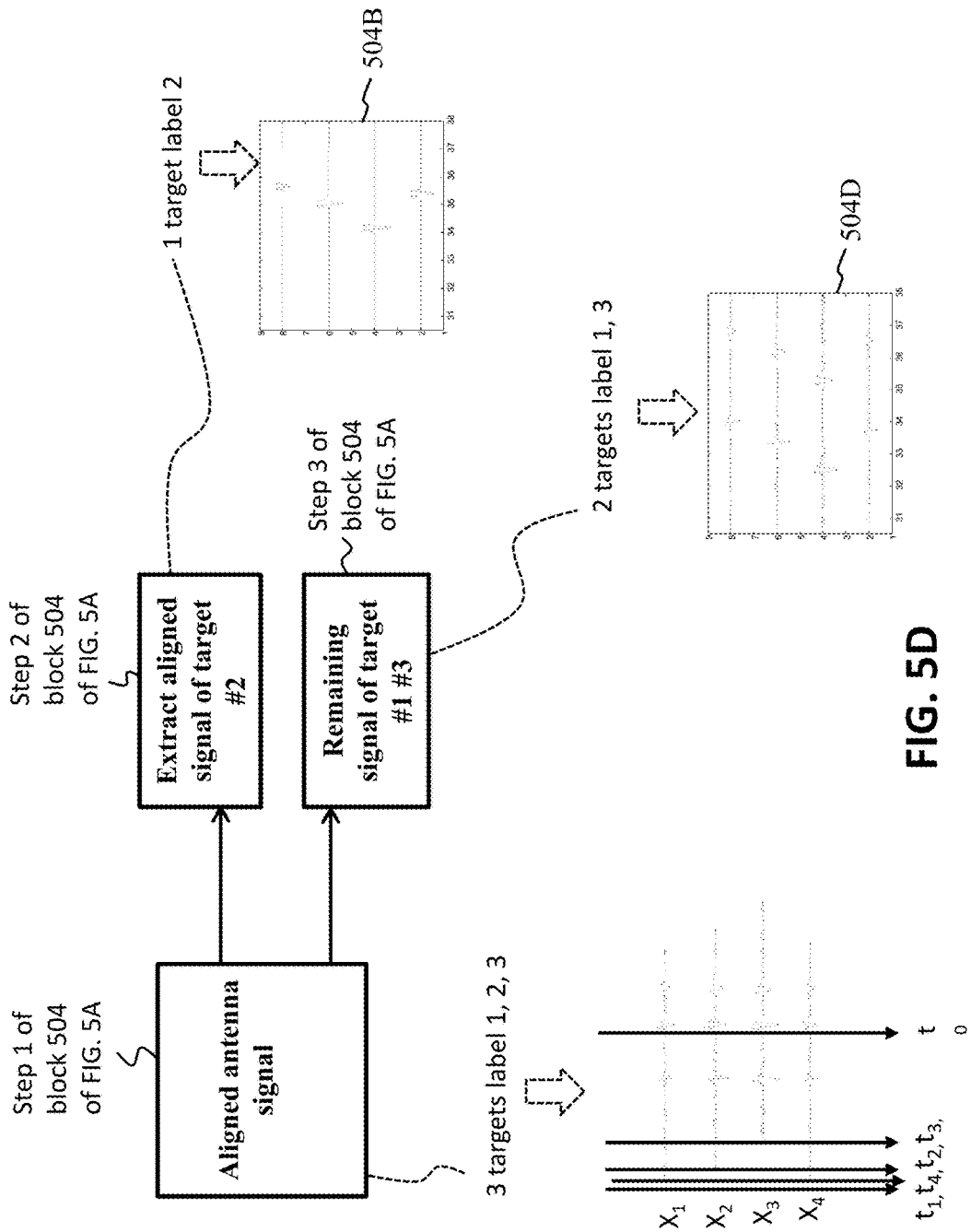
FIG. 5D is a block diagram of step 504 of the iterative method of block 400 of FIG. 5A that includes details of target signal extraction, according to embodiments of the present disclosure.

FIG. 5D refers the details of extracting the coherent signal 504B. If this coherent signal 504B corresponds to a target in graph 505 of FIG. 5A, then the target signal 504B and target location 504C is saved in block 402 of FIG. 5A and to be projected to a uniform linear array in block 405 of FIG. 4 to generate graph signal 404, which is then to be processed with delay-and-sum radar imaging 406 of FIG. 4. The target signal 504B in FIG. 5D is then subtracted from residual data 402, the updated residual data 402 will be examined for a next strongest target detection. If the coherent signal 504B of FIG. 5A does not corresponds to a target in graph 505 of FIG. 5A, the system stops searching targets, and performs imaging 406 on projected data 404 of FIG. 4 to form a focused image 410 of FIG. 4. The focused image 410 of FIG. 4 is illustrated in graph 420 of FIG. 4.

Details of Method

We consider a two-dimensional (2D) radar imaging problem in which a total of D distributed radar platforms are moving towards a ROI to detect targets within. As noted above, FIG. 1A illustrates distributed arrays of moving radar platforms 101 for detecting targets 130 in the ROI 140. Each radar platform forms a forward-looking virtual array. We use p (t) and P ($\omega$) to denote the time-domain source pulse 110 and its corresponding frequency spectrum, respectively, where $$P(\omega) = \int_\mathbb{R} p(t) e^{-j\omega t} dt. \quad (1)$$

The scattered field at location r' due to the target with a phase center at l and the excitation pulse originating from r, can be approximated with the first-Born approximation as $$Y_l(\omega, r, r') = P(\omega) S(\omega, l) G(\omega, l, r) G(\omega, r', l), \quad (2)$$

where S($\omega$, l) is a complex-valued function of frequency, which accounts for all the terms due to the asymptotic approximation; G($\omega$, l, r) accounts for propagation from r to l and can be represented by $$G(\omega, l, r) = a(r, l) e^{-j\omega \frac{\|r-l\|}{c}}, \quad (3)$$

where a(r, l) represents the overall magnitude attenuation due to the antenna beam pattern and the propagation between r and l, and $$e^{-j\omega \frac{\|r-l\|}{c}}$$

is the phase change term of the received signal relative to the source pulse after propagating distance $\|r-l\|$ at speed c. For simplicity, we have omitted the noise term from Eq. (2).

Without a loss of generality, assume that there are up to K targets, each with a phase center located at a pixel in the ROI image. Let $i_k \in \{1, \ldots, I\}$ be the pixel index of the kth target and $l_{i_k}$ be the corresponding location. Let $r_{d,n}$ be the ideal location of the nth element of the dth array, where $n \in \{1, 2, \ldots, N\}$ and $d \in \{1, 2, \ldots, D\}$. Due to position perturbations, the actual measurements are taken at $\tilde{r}_{d,n} = r_{d,n} + \varepsilon_{d,n}$, where $\varepsilon_{d,n}$ stands for corresponding unknown position perturbation with $0 \leq |\varepsilon_{d,n}| \leq 10\lambda$, and $\lambda$ is the wavelength of the radar central frequency. The overall signal received by the perturbed array is then a superposition of scattered waves from all targets in the ROI. For the source signal transmitted by the $d_0$ th array, where $d_0 \in \{1, 2, \ldots, D\}$, we consider measurements at a discrete frequency $\omega_m$, where m=1, 2, ..., M. The received reflections 120 can be represented by an M×D×N data cube $\tilde{Y}_0$, whose entry (m, d, n) is $$\tilde{Y}_0(m, d, n) = \sum_{k=1}^{K} P(\omega_m) S(\omega_m, l_{i_k}) a(\tilde{r}_{d_0,n}, l_{i_k}) \quad (4a)$$

$$a(\tilde{r}_{d,n}, l_{i_k}) \exp\left(-j\omega \frac{\|\tilde{r}_{d_0,n} - l_{i_k}\| + \|\tilde{r}_{d,n} - l_{i_k}\|}{c}\right).$$

After range compression using the source pulse P($\omega$), we end up with an M×D×N data cube $\tilde{Y}$, whose entry (m, d, n) is $$\tilde{Y}(m, d, n) = \sum_{k=1}^{K} |P(\omega_m)|^2 S(\omega_m, l_{i_k}) a(\tilde{r}_{d_0,n}, l_{i_k}) \quad (4b)$$

$$a(\tilde{r}_{d,n}, l_{i_k}) \exp\left(-j\omega_m \frac{\|\tilde{r}_{d_0,n} - l_{i_k}\| + \|\tilde{r}_{d,n} - l_{i_k}\|}{c}\right).$$

To simplify notation, we define a scalar $$x_{i_k}^{(d,n)} = a(\tilde{r}_{d_0,n}, l_{i_k}) a(\tilde{r}_{d,n}, l_{i_k}) \sum_{m=1}^{M} |P^2(\omega_m) S(\omega_m, l_{i_k})|^2, \quad (5)$$

an M×1 unit vector $$\phi_{i_k} = \begin{bmatrix} \frac{|P(\omega_1)|^2 S(\omega_1, l_{i_k})}{\sum_{m=1}^{M} |P^2(\omega_m) S(\omega_m, l_{i_k})|^2} \\ \frac{|P(\omega_2)|^2 S(\omega_2, l_{i_k})}{\sum_{m=1}^{M} |P^2(\omega_m) S(\omega_m, l_{i_k})|^2} \\ \vdots \\ \frac{|P(\omega_M)|^2 S(\omega_M, l_{i_k})}{\sum_{m=1}^{M} |P^2(\omega_m) S(\omega_m, l_{i_k})|^2} \end{bmatrix}, \quad (6)$$

and an M×1 exponential vector $$\tilde{\psi}_{i_k}^{(d,n)} = \begin{bmatrix} e^{-j\omega_1 \frac{\|\tilde{r}_{d_0,n} - l_{i_k}\| + \|\tilde{r}_{d,n} - l_{i_k}\|}{c}} \\ e^{-j\omega_2 \frac{\|\tilde{r}_{d_0,n} - l_{i_k}\| + \|\tilde{r}_{d,n} - l_{i_k}\|}{c}} \\ \vdots \\ e^{-j\omega_M \frac{\|\tilde{r}_{d_0,n} - l_{i_k}\| + \|\tilde{r}_{d,n} - l_{i_k}\|}{c}} \end{bmatrix} \quad (7)$$

The vector $\tilde{y}^{(d,n)} = \tilde{Y}(:, d, n)$ can then be written in a matrix-vector form as $$\tilde{y}^{(d,n)} = \sum_{k=1}^{K} \left(\phi_{i_k} \circ \tilde{\psi}_{i_k}^{(d,n)}\right) x_{i_k}^{(d,n)} = \left[\Phi \circ \tilde{\Psi}^{(d,n)}\right] x^{(d,n)} = \tilde{\Gamma}^{(d,n)} x^{(d,n)}, \quad (8)$$

where the symbol $\circ$ represents element-wise product. Here, $\tilde{\Gamma}^{(d,n)} = [\phi_1 \circ \tilde{\psi}_1^{(d,n)}, \ldots, \phi_I \circ \tilde{\psi}_I^{(d,n)}]$ is an M×I projection matrix of the nth antenna position in the d th array, $x^{(d,n)} = [x_1^{(d,n)}, \ldots, x_I^{(d,n)}]^T$ is a I×1 vector of target scattering coefficients. It is important to note that $\phi_{i_k}$ is a target signature vector independent of antenna positions, which is extracted from measured data efficiently during the imaging formation.

1. Extract Coherent Signal of Graph 402 of FIG. 4

1.1 Optimization Problem

Since the antenna positions $\tilde{r}_{d,n}$ are not known exactly, image formation that treats the perturbed array as a uniform array generally yields a de-focused image with its quality related to the position perturbations. In order to perform imaging with autofocus, we solve the following sparsity constrained optimization problem $$\min_{\tilde{\Gamma}, x} \left\{ \sum_{d=1}^{D} \sum_{n=1}^{N} \|\tilde{y}^{(d,n)} - \tilde{\Gamma}^{(d,n)} x^{(d,n)}\|_2^2 \right\} \quad (9)$$

$$\text{subject to } \left\| \sum_{d=1}^{D} \sum_{n=1}^{N} x^{(d,n)} \right\|_0 \leq K,$$

where $\tilde{\Gamma} = \{\tilde{\Gamma}^{(d,n)}\}_{d,n}$ and $x = \{x^{(d,n)}\}_{d,n}$. The above optimization problem is similar to the group sparsity formulation that is often used in compressive sensing imaging [15]. Specifically, it relies on the fact that all unknown vectors share the same non-zero support but have generally different values within the support. However, the autofocusing problem formulated in eq. (9) is more general than the group sparsity problem since the projection matrices are not identical across all antennas. They share the same target signature vector $\phi_{i_k}$, but are different in the unknown exponential term $\tilde{\psi}_{i_k}^{(d,n)}$.

Motivated by the orthogonal matching pursuit algorithm, we solve (9) iteratively with maximum of K iterations. At the kth iteration, given the residual data $\tilde{y}_{res,k}^{(d,n)}$, which is initialized as measured data, and updated at each iteration by removing the signals of all the detected targets, we have a degenerated problem $$\min_{\tilde{\Gamma}, x} \left\{ \sum_{d=1}^{D} \sum_{n=1}^{N} \|\tilde{y}_{res,k}^{(d,n)} - \tilde{\Gamma}_{i_k}^{(d,n)} x_{i_k}^{(d,n)}\|_2^2 \right\} \quad (10)$$

$$\text{subject to } \left\| \sum_{d=1}^{D} \sum_{n=1}^{N} x_{i_k}^{(d,n)} \right\|_0 = 1.$$

Note that the $\ell_0$-norm of vectors $\{x_{i_k}^{(d,n)}\}$ is 1, where the only non-zero component corresponding the strongest target phase center of each iteration. Let the image reconstructed by the residual data $\tilde{y}_{res,k}^{(d,n)}$ be $\hat{x}_{res,k}$. A target is then detected at location $l_{i_k}$ where the maximum absolute value of $\hat{x}_{res,k}$ is observed as follows $$i_k = \arg\max_i \{|\hat{x}_{res,k}(i)|\}. \quad (11)$$

To determine $\tilde{\Gamma}$, we stack $\{\tilde{y}_{res,k}^{(d,n)}\}$ to form an M×ND matrix $$\tilde{Y}_{res,k} = [\tilde{y}_{res,k}^{(1,1)}, \tilde{y}_{res,k}^{(1,2)}, \ldots, \tilde{y}_{res,k}^{(2,1)}, \ldots, \tilde{y}_{res,k}^{(D,N)}]. \quad (12)$$

Similarly, vectors $\{\tilde{\Gamma}_{i_k}^{(d,n)} x_{i_k}^{(d,n)}\}$ were also stacked into an M×ND matrix. The stacked matrix $\{\tilde{\Gamma}_{i_k}^{(d,n)} x_{i_k}^{(d,n)}\}$ is then re-organized as $$[\tilde{\Gamma}_{i_k}^{(1,1)} x_{i_k}^{(1,1)}, \tilde{\Gamma}_{i_k}^{(1,2)} x_{i_k}^{(1,2)}, \ldots, \tilde{\Gamma}_{i_k}^{(D,N)} x_{i_k}^{(D,N)}] = \quad (13)$$

$$[x_{i_k}^{(1,1)} \phi_{i_k}, \ldots, x_{i_k}^{(D,N)} \phi_{i_k}] \circ [\tilde{\psi}_{i_k}^{(1,1)}, \ldots, \tilde{\psi}_{i_k}^{(D,N)}] = E_{i_k} \circ \Psi_{i_k},$$

where $E_{i_k} = [x_{i_k}^{(1,1)} \cdot \phi_{i_k}, \ldots, x_{i_k}^{(D,N)} \cdot \phi_{i_k}]$ is an M×DN rank-one matrix, whose dominant left singular vector is exactly $\phi_{i_k}$, and $\tilde{\Psi}_{i_k} = [\tilde{\psi}_{i_k}^{(1,1)}, \ldots, \tilde{\psi}_{i_k}^{(D,N)}]$ is an M×DN exponential matrix parameterized by the distance between the kth target and the perturbed distributed arrays. Based on (12) and (13), and given x, $\tilde{\Gamma}$ can be determined by solving $$\min_{E_{i_k}, \Psi_{i_k}} \|\tilde{Y}_{res,k} - E_{i_k} \circ \Psi_{i_k}\|_F^2, \text{ s.t. rank}(E_{i_k}) = 1, \tag{14}$$

where the subscript $_F$ represents the Frobenius norm of the matrix. Equation (14) is then solved by an inner loop in which we alternately update $\tilde{\Psi}_{i_k}$ by data coherence analysis, described in FIG. 5A to FIG. 5D to the steps of block 400 is FIG. 4, and $E_{i_k}$ by dominant target signature analysis, as described later in 1.3

1.2 Data Coherence Analysis and Estimate Time Shift for Alignment

FIG. 5A in block 501 shows the data coherence analysis using cross-correlation such that the signals measurement by distributed platforms are correlated to each other to the maximum extent.

FIG. 5B illustrates the details of block 502 in FIG. 5A specific to the estimate time shift for alignment for each individual potential target. To estimate time lags, we use the cross-correlation (CC) of signals. Specifically, given $\tilde{Y}_{res,k}$ and $E_{i_k}$, we compute the time-delay parameter $\tilde{\Psi}_{i_k}$ by finding the delay corresponding to the maximum of the CC function. However, CC is not concave and, thus, may have multiple local maxima. To reduce ambiguity in the CC function, we extract the kth target response using time gating. Assume that at the kth iteration, we reconstruct an image $\hat{x}_{res,k}$ using residual data $\{y_{res,k-1}^{(d,n)}\}$. With the target location, the residual signal is gated in time as $$\hat{y}_{i_k}^{(d,n)}(t) = \begin{cases} y_{res,k-1}^{(d,n)}(t), & |t - \tau_{i_k}^{(d,n)}| \leq \frac{20\lambda}{c} \\ 0, & |t - \tau_{i_k}^{(d,n)}| > \frac{20\lambda'}{c} \end{cases} \tag{15}$$

where $y_{res,k-1}^{(d,n)}(t)$ the time-domain residual signal, and $\tau_{i_k}^{(d,n)} = (\|r_{d,n} - 1_{i_k}\| + \|r_{d,n} - 1_{i_k}\|)/c$. Note that the time-gating boundary $(20\lambda)/c$ is determined by the maximum position perturbation. It can be tightened by considering the smooth trajectory of each radar platform. Let $\hat{y}_{i_k}^{ref}(t)$ be the time domain signal of the dominant vector $\phi_{i_k}$ of $E_{i_k}$. We then take $\hat{y}_{i_k}^{ref}(t)$ as a reference, and estimate the time shift of $\hat{y}_{i_k}^{(d,n)}(t)$ in (12) as $$\hat{\tau}_{ref}^{(d,n)} = \underset{\tau}{\text{argmax}} \left\{ \int \hat{y}_{i_k}^{(d,n)}(t) \cdot \hat{y}_{i_k}^{ref}(t+\tau) dt \right\}. \tag{16}$$

Let $\tilde{\tau}_{i_k}^{(d,n)} = (\|\tilde{r}_{d_0,n} - 1_{i_k}\| + \|\tilde{r}_{d,n} - 1_{i_k}\|)/c$ represent the unknown pulse propagation time from $\tilde{r}_{d_0,n}$ to $\tilde{r}_{d,n}$ via $1_{i_k}$. Based on (16), and assuming the total propagation time is the same as that of the ideal distributed uniform array, we have the following equations to solve $\tilde{\tau}_{i_k}^{(d,n)}$ for all $d \in [1, 2, \ldots, D]$ and $n \in [1, 2, \ldots, N]$, such that the signals in (15) are coherent at $1_{i_k}$ after back-propagation, $$\begin{cases} \tilde{\tau}_{i_k}^{(d,n)} - \tilde{\tau}_{i_k}^{ref} = \hat{\tau}_{ref}^{(d,n)}, \\ \sum_{n=1}^{D} \sum_{n=1}^{N} \tilde{\tau}_{i_k}^{(d,n)} = \sum_{n=1}^{D} \sum_{n=1}^{N} \tau_{i_k}^{(d,n)}. \end{cases} \tag{17}$$

With the solution $\tilde{\tau}_{i_k}^{(d,n)}$ of (17), $\tilde{\psi}_{i_k}^{(d,n)}$ is computed using (7).

1.3 Target Signature Extraction of 504B of FIG. 5A

Given $\tilde{\Psi}_{i_k}$, we determine $E_{i_k}$ using singular value decomposition (SVD) of $\overline{Y}_{res,k} = \tilde{Y}_{res,k} \circ \tilde{\Psi}_{i_k}^*$ [16]:

$$\overline{Y}_{res,k} = U_k \Sigma_k V_k^H, \tag{18}$$

where the superscript $^*$ represents the phase conjugate and the superscript $^H$ represents the Hermitian transpose. Based on the SVD, we have $$E_{i_k} = \sigma_{k_1} u_{k_1} v_{k_1}^H, \tag{19}$$

where $\sigma_{k_1}$ is the largest singular value of $\overline{Y}_{res,k}$ representing the strength of the kth target, $v_{1,i_k}^H$ is the corresponding right singular vector representing the antenna pattern, and $u_{k_1}$ is the corresponding left singular vector representing target signature, $$\hat{\phi}_{i_k} = u_{k_1}. \tag{20}$$

Since the largest singular value $\sigma_{1,i_k}$ is related to the target strength, we terminate our algorithm based on the target strength relative to the background noise. Specifically, we terminate when $$\frac{\sigma_{k_1} - \sigma_{k_2}}{\sigma_{k_1}} < \varepsilon$$

is satisfied, where $\sigma_{k_2}$ is the second largest singular value of $\overline{Y}_{res,k}$, and $\varepsilon$ is a threshold with value $0 < \varepsilon < 1$.

2. Antenna Position Estimation

Figure 7A:
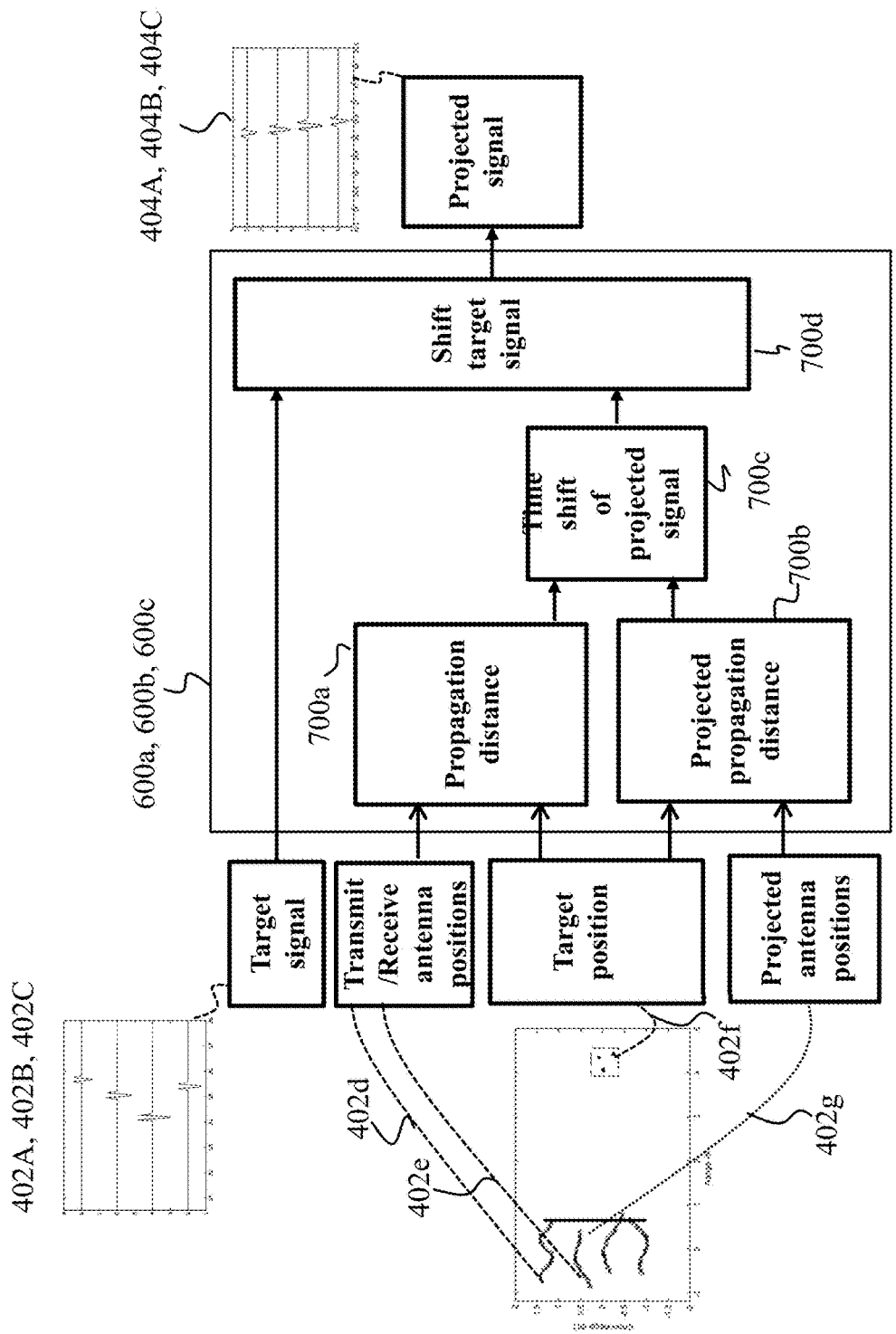
FIG. 7A is a block diagram of signal projection steps 600a, 600b, 600c, according to the embodiments of the present disclosure.
Figure 7B:
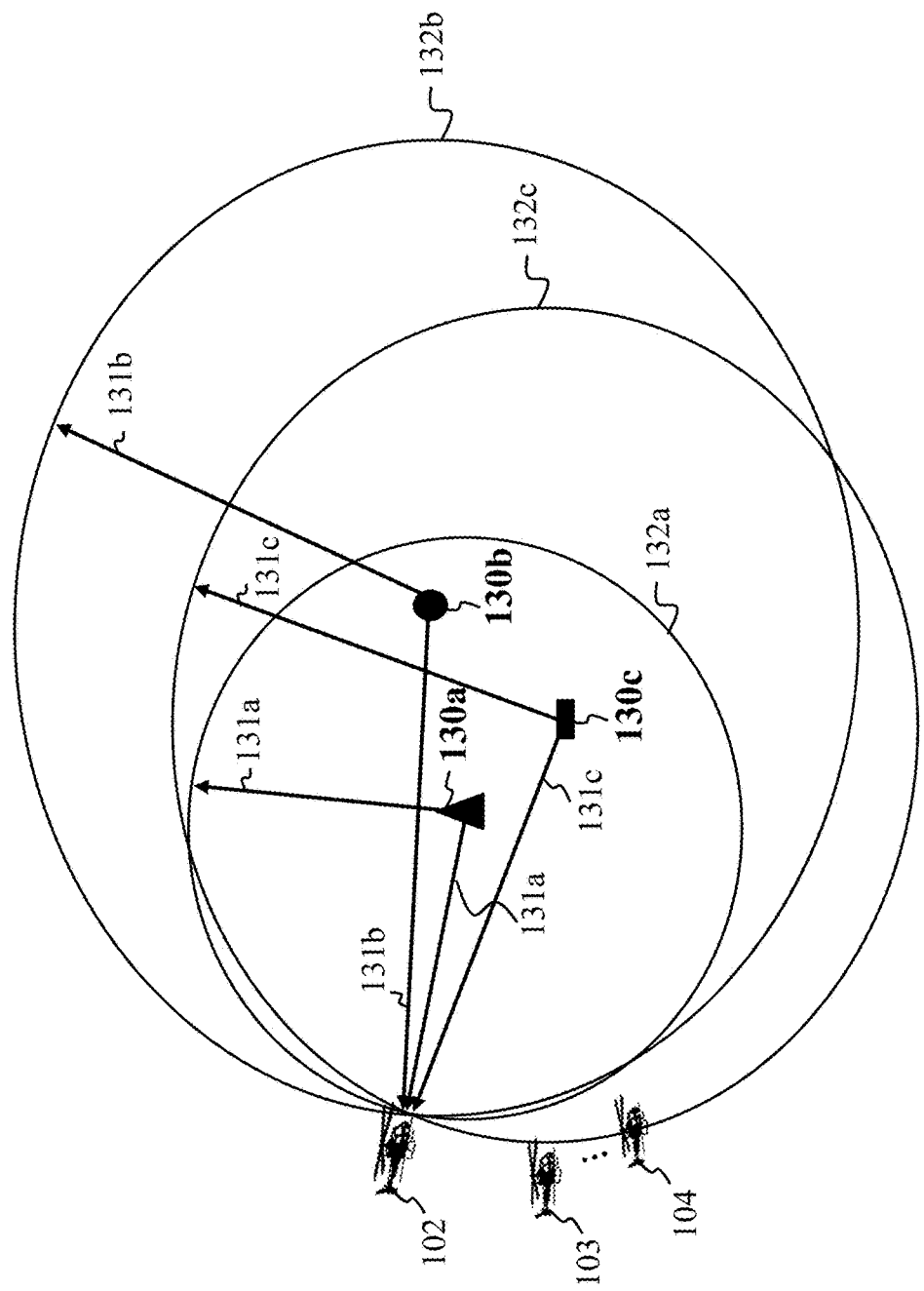
FIG. 7B is schematic illustrating of determining an antenna location based on the distances from the antenna to all targets, according to the embodiments of the present disclosure.

FIG. 5C is a block diagram of step 503 of the iterative method of block 400 of FIG. 5A that includes details of estimating propagation distance between antennas and targets, i.e. the estimated position shift for each antenna, according to embodiments of the present disclosure;

Referring to FIG. 7B, based on the propagation time between each antenna and all k detected targets after the kth iteration, we estimate the array element positions (FIG. 7B) by minimizing the cost functions $$\hat{r}_k^{(d_0,n)} = \underset{r}{\text{argmin}} \left\{ \left\| \left(r - r_{d_0,n}, \frac{r_{d_0,n+1} - r_{d_0,n}}{\|r_{d_0,n+1} - r_{d_0,n}\|} \right) \right\|^2 + \right. \tag{21}$$

$$\left. \sum_{k'=1}^{k} \frac{\sigma_{k_1'}'}{\sum_{k'=1}^{k} \sigma_{k_1'}} \left( \|r - 1_{i_{k'}}\| - \frac{\tilde{\tau}_{i_{k'}}^{(d_0,n)} c}{2} \right)^2 \right\}, \text{ and}$$

$$\hat{r}_k^{(d,n)} = \underset{r}{\text{argmin}} \left\{ \left\| \left(r - r_{d,n}, \frac{r_{d,n+1} - r_{d,n}}{\|r_{d,n+1} - r_{d,n}\|} \right) \right\|^2 + \right. \tag{22}$$

$$\left. \sum_{k'=1}^{k} \frac{\sigma_{k_1'}'}{\sum_{k'=1}^{k} \sigma_{k_1'}} \left( \|r - 1_{i_{k'}}\| - \left( \tilde{\tau}_{i_{k'}}^{(d,n)} - \frac{\tilde{\tau}_{i_{k'}}^{(d_0,n)}}{2} \right) c \right)^2 \right\},$$

for $d \neq d_0$. Each of the cost functions above is composed of two parts. The first part minimizes the azimuth discrepancy between the perturbed antenna and its ideal position. The second part restricts the distance in the range direction according to the propagation time. We use normalized target strength $\sigma_{k'_1}/(\Sigma_{k'=1}^{k}\sigma_{k'_1})$ to weight the contribution of targets according to their scattering strength. While the cost functions in the optimization (21) and (22) are not convex, it might be possible to computationally find their global optimal solutions using the algorithm with a proper initial value of r.

FIG. 5B is a block diagram of step 502 of the iterative method of block 400 of FIG. 5A that includes details of computing time shift of different antennas, according to embodiments of the present disclosure. Note that since the antenna locations are determined based on distance measurements, which are translation and rotation invariant, we assume in our simulations that the mean and the dominant orientation of the perturbed array are the same as the ideal uniform array. To remove the translation and the rotation effects of the perturbed antennas and keep the distance between the perturbed antennas and targets unchanged, a linear transform on both the antenna locations and the target locations is necessary.

Figure 7C:
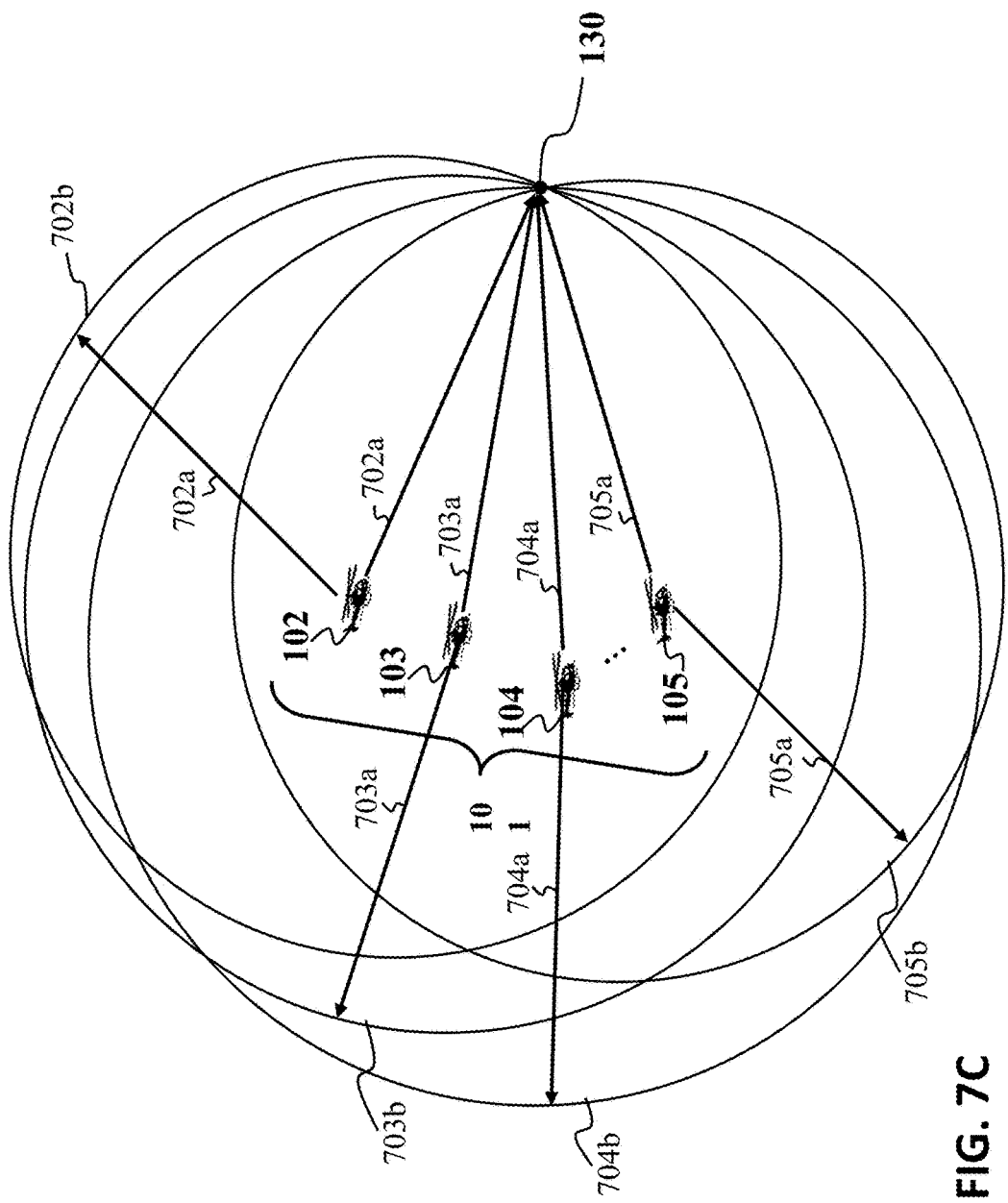
FIG. 7C is schematic illustrating determining a target location based on the distances from the target to all antennas, according to embodiments of the present disclosure.

Referring to FIG. 7C, the updated antenna positions are then used to estimate the next target position using the residual data, as schematically illustrated in FIG. 7C.

3. Data Projection 405 and Image Reconstruction 406

Given the estimated projection matrix $$\hat{\Gamma}_k^{(d,n)} = [\hat{\phi}_{i_1} \circ \tilde{\psi}_{i_1}^{(d,n)}, \hat{\phi}_{i_2} \circ \tilde{\psi}_{i_2}^{(d,n)}, \ldots, \hat{\phi}_{i_k} \circ \tilde{\psi}_{i_k}^{(d,n)}], \quad (23)$$

scattering coefficients are computed using least squares, $$\hat{x}_k^{(d,n)} = (\hat{\Gamma}_k^{(d,n)})^{\dagger} \tilde{y}^{(d,n)}, \quad (24)$$

where $\hat{x}_k^{(d,n)}$ is a k×1 vector representing scattering coefficients of the k detected targets and the superscript † denotes the Penrose-Moore pseudoinverse. A sparse image $\hat{x}_{s,k}$ of the ROI is then reconstructed by assigning $\hat{x}_k^{(d,n)}$ to the corresponding pixel locations as follows $$\hat{x}_{s,k}(i_{k'}) = \Sigma_{d=1}^{D} \Sigma_{n=1}^{N} \hat{x}_k^{(d,n)}(k'), \quad (25)$$

for all k'∈[1, ..., k]. For the purpose of target recognition, a dense image preserving target signature information can also be reconstructed by incorporating the target signatures. We first project data of an ideal side-looking uniform array using k detected target signature dictionaries 405 as follows $$\hat{y}_k^{(d,n)} = \Sigma_{k'=1}^{k} \hat{x}_{i_{k'}}^{(d,n)} \cdot (\hat{\phi}_{i_k} \circ \Psi_{i_{k'}}^{(d,n)}), \quad (26)$$

where $\psi_{i_{k'}}^{(d,n)}$ has the same expression as $\tilde{\psi}_{i_k}^{(d,n)}$ except using the ideal uniform element position $r_{d,n}$. Based on the reconstructed data, we then perform delay-and-sum imaging to reconstruct a dense image 406

$$\hat{x}_{d,k} = \Sigma_{d=1}^{D} \Sigma_{n=1}^{N} (\Psi^{(d,n)})^H \hat{y}_k^{(d,n)}, \quad (27)$$

where $\Psi^{(d,n)}$ is an M×I exponential matrix related to the ideal uniform array and the whole ROI.

Figure 6A:
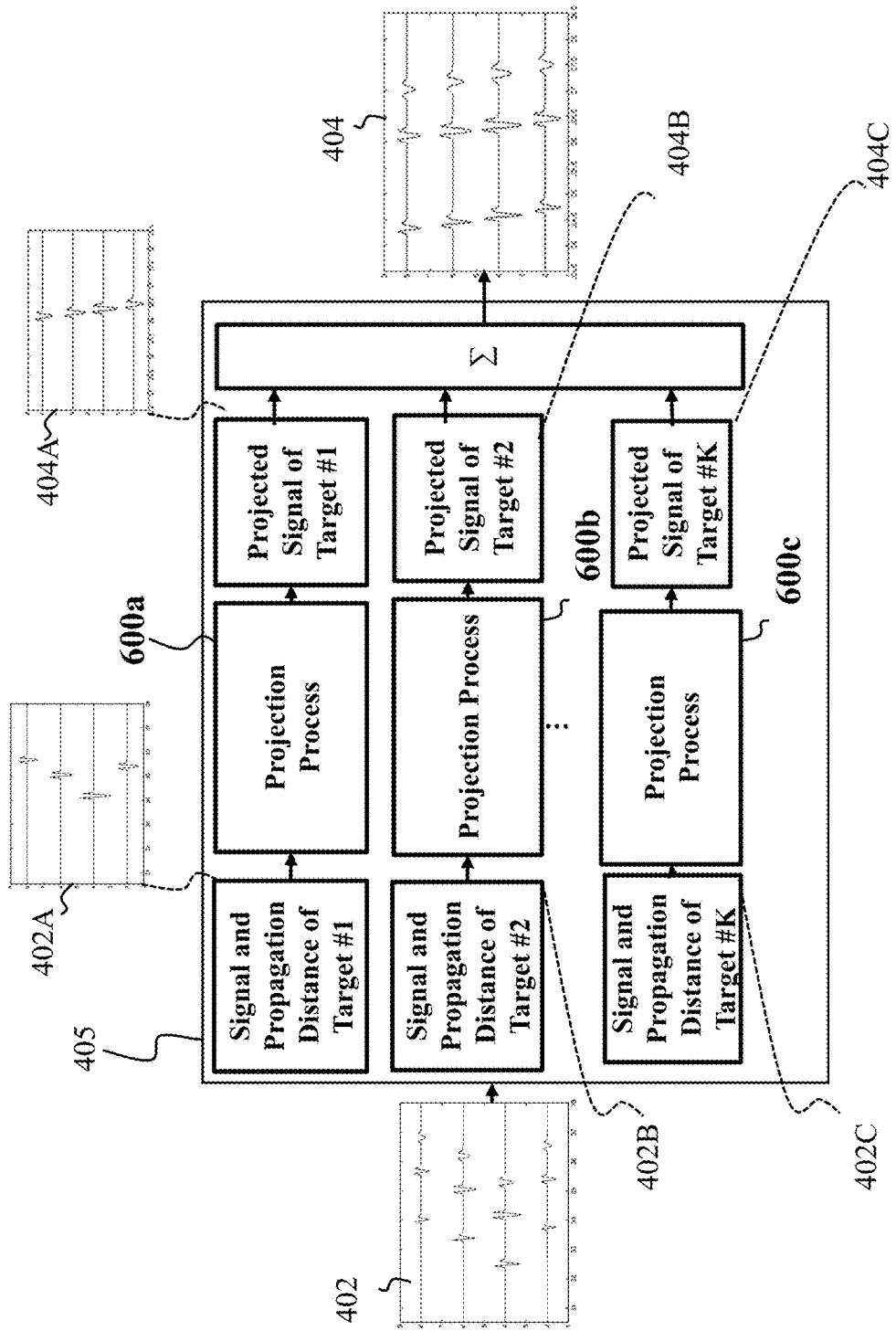
FIG. 6A is a block diagram of step 405 of the iterative method of block 340 of FIG. 4 that includes details of signal projection, according to embodiments of the present disclosure.

FIG. 6A is a block diagram of step 405 of the iterative method of the detailed review of block 340 of FIG. 4 (i.e. block 340 is the auto-focus imaging processor (340) of the computer 300A of FIG. 3A and 300b of FIG. 3B), that includes details of projecting the signal of each detected target to the signal received by a uniform array. Given the input coherent signals 402 of detected targets, the projection processed is performed target by target. For example, the coherent signal 402A of target #1 is projected, see details illustrated in FIG. 7A, according to the difference of propagation distance from the target to each of the receiver antennas and from the target to the corresponding projected uniform distributed antenna, the coherent signal are shifted in time to generate the projected coherent signal 404A. The projected signals of targets are summed together to form projected signal 404 of the projected uniform linear array.

Figure 6C:
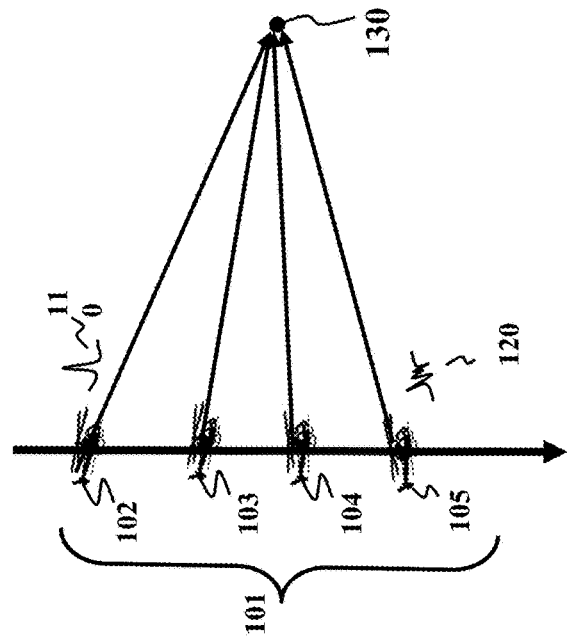
FIG. 6B and FIG. 6C are schematic illustrating antenna positions before and after signal projection, according to the embodiments of the present disclosure.
Figure 6B:
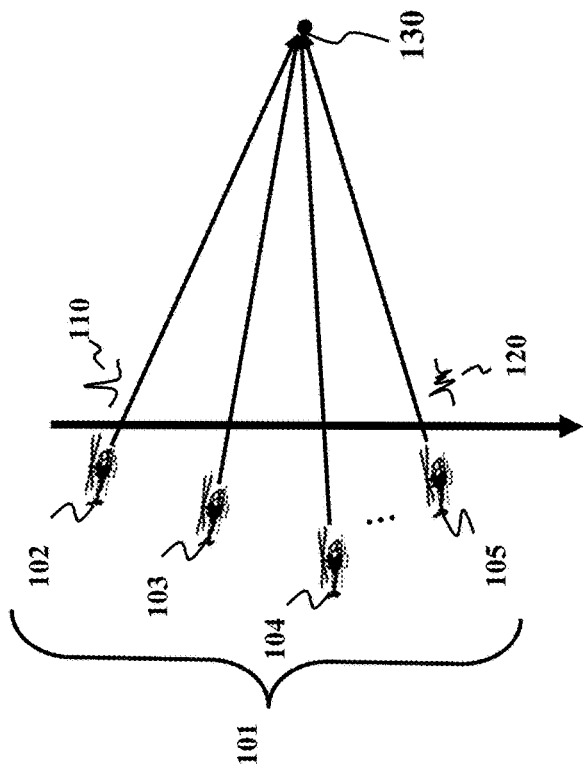

FIG. 6B and FIG. 6C are schematics illustrating antenna positions before (FIG. 6B) and after (FIG. 6C) signal projection. FIG. 6B illustrates the actual antenna positions before the signal projection. FIG. 6C illustrates the antenna positions after the signal projection, wherein the receiver antennas are uniformly distributed in a straight line with the same aperture size as the distributed array.

FIG. 7A is a block diagram of signal projection steps 600a, 600b, 600c, for each target. The projection projection process is performed for each target and for each antenna position. For each target signal 402A, 402B, 402C, measured by an antenna 402e, the propagation distance is computed given the transmit antenna position 402d, receiver antenna positions 402e and the target position 402f, the propagation distance 700a is computed. Given the target position 402f and projected uniform linear array position 402g, the projected propagation distance 700b is computed. The time shift 700c is then computed based on the difference of 700a and 700b. The coherent signal of target 402A, 402B, 402C is then separately shifted in time 700d to form projected coherent signal 404A, 404B, and 404C.

FIG. 7B is schematic illustrating determining an antenna location based on the distances from the antenna to all targets. Given target locations 130a, 130b and 130c, and the distances 131a, 131b and 131c from an antenna 102 to the targets 130a, 130b, and 130c, circles 132a, 132b, and 132c are drawn. The intersection indicates the location of the antenna 102.

FIG. 7C is schematic illustrating determining a target location based on the distances from the target to all antennas. Given antenna positions 102, 103, 104, and 105, and the distances 702a, 703a, 704a, and 705a, from a target 130 to the antennas 102, 103, 104, and 105, circles 702b, 703b, 704b, and 705b are drawn. The intersection of circles 702b, 703b, 704b, and 705b indicates the location of the target 130.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed:

1. A method for fusing a radar image in response to radar pulses transmitted to a region of interest (ROI), a transmitter of a distributed receiver from a set of distributed receivers transmits the radar pulses toward the ROI and the set of distributed receivers receive a set of reflections from at least one target located in the ROI, each distributed receiver communicates to a ground central controller, the received reflections and a coarse location, wherein the coarse position includes unknown position perturbations, the method comprising:
   receiving the set of reflections from the at least one target, each reflection is recorded by each distributed receiver from the set of distributed receivers at a corresponding time and at a corresponding coarse location;
   aligning the set of reflections on a time scale using the corresponding coarse locations of the set of distributed receivers to produce a time projection of the set of reflections for the at least one target;
   fitting a line into data points formed from radar pulses in the set of reflections received from the set of distributed receivers;
   determining for each distributed receiver a distance between the fitted line and each data point, wherein the distance correlates to the unknown position perturbations;
   adjusting each coarse position for each distributed receiver of the set of distributed receivers using the corresponding distance between the fitted line and each data point, to generate an image having a focus greater than an image generated with the coarse position; and
   fusing the radar image using the set of reflections received at the adjusted coarse position of the set of distributed receivers.

2. The method of claim 1, wherein adjusting the coarse position of the set of distributed receivers using the corresponding distance between the fitted line and each data point, results in a virtual uniform linear array of the set of distributed receivers.

3. The method of claim 1, wherein each distributed receiver in the set of distributed receivers is moving and randomly distributed at a same side of the at least one target.

4. The method of claim 1, wherein each distributed receiver in the set of distributed receivers has a random orientation within a predetermined angular range, with respect to the at least one target.

5. The method of claim 1, wherein the fused radar image is a high resolution two-dimensional (2D) radar image, wherein the high resolution 2D radar image corresponds to the radar reflections that are aligned in time, and add up spatially at the at least one target position to form a focused image of the at least one target.

6. The method of claim 1, wherein the at least one target includes multiple targets located in the ROI.

7. The method of claim 6, wherein the received set of reflections from the multiple targets are processed using iterative sparsity-driven procedures with data coherence analysis, so as to identify a target within the multiple targets.

8. The method of claim 7, wherein data-coherence based sparsity-driven procedures include initializing the set of reflections received from the set of distributed receivers using the received set of reflections, and the iterative steps of:
   extracting a set of reflections from a first target,
   aligning the set of reflections on a time scale using the corresponding coarse locations of the set of distributed receivers to produce a time projection of the set of reflections for the first target,
   subtracting the set of reflections of the first target from the set of reflections of the set of distributed receivers, wherein if the set of reflections of the first target are not corresponding to at least one target of the multiple targets, then the iteration ends, and otherwise:
   perform imaging on the set of reflections of the first target.

9. The method of claim 8, wherein performing imaging on the set of reflections of the first target includes performing the steps of:
   fitting a line into data points formed from radar pulses in the set of reflections received from the set of distributed receivers for the first target;
   determining a distance between the fitted line and each data point;
   adjusting the coarse position of the set of distributed receivers using the corresponding distance between the fitted line and each data point; and
   fusing the radar image using the set of reflections received at the adjusted coarse position of the set of distributed receivers.

10. The method of claim 1, wherein the ground central controller includes an imaging processor, the imaging processor is configured to execute stored instructions, as well as be in communication with a memory that stores instructions that are executable by the imaging processor.

11. The method of claim 1, wherein the coarse location is obtained by a GPS device at a moment the received reflections are received by the distributed receiver.

12. The method of claim 1, wherein the coarse position of each distributed receiver of the set of distributed receivers corresponds to a range position, such that the range position is a shape of a circle with a center location of the circle positioned at a location of the at least one target, and a radius distance of the circle is a distance from the center of the circle to the coarse position, wherein the unknown position perturbations is a azimuth discrepancy between a perturbed antenna that is a location of the distributed receiver and an ideal position corresponding to a nearest point of a perimeter of the circle from the distributed receiver.

13. A non-transitory computer readable storage medium embodied thereon a program executable by a processor of a ground central controller for performing a method, the method for fusing a radar image in response to radar pulses transmitted to a region of interest (ROI), a transmitter of a distributed receiver from a set of distributed receivers transmits the radar pulses toward the ROI and the set of distributed receivers receive a set of reflections from at least one target located in the ROI, each distributed receiver communicates to the ground central controller, the received reflections and a coarse location, wherein the coarse position includes unknown position perturbations, the method comprising:
   storing, by the processor, the set of reflections received from the at least one target, wherein each reflection is recorded by each distributed receiver from the set of distributed receivers at a corresponding time and at a corresponding coarse location;
   aligning, by the processor, the set of reflections on a time scale using the corresponding coarse locations of the set of distributed receivers to produce a time projection of the set of reflections for the at least one target;

fitting, by the processor, a line into data points formed from radar pulses in the set of reflections received from the set of distributed receivers;

determining, by the processor, for each distributed receiver a distance between the fitted line and each data point, wherein the distance correlates to the unknown position perturbations;

adjusting, by the processor, each coarse position of the set of distributed receivers using the corresponding distance between the fitted line and each data point, to generate an image having a focus greater than an image generated with the coarse position; and fusing, by the processor, the radar image using the set of reflections received at the adjusted coarse position of the set of distributed receivers.

14. The non-transitory computer readable storage medium of claim 13, wherein upon the adjusting of the coarse position of the set of distributed receivers, results in a virtual array of the set of distributed receivers.

15. The non-transitory computer readable storage medium of claim 13, wherein each distributed receiver in the set of distributed receivers is moving and randomly distributed at a same side of the at least one target.

16. The method of claim 13, wherein each distributed receiver in the set of distributed receivers has a random orientation within a predetermined angular range, with respect to the at least one target.

17. The non-transitory computer readable storage medium of claim 13, wherein the fused radar image is a high resolution two-dimensional (2D) radar image, wherein the high resolution 2D radar image corresponds to the radar reflections that are aligned in time, and add up spatially at the at least one target position to form a focused image of the at least one target.

18. The non-transitory computer readable storage medium of claim 13, wherein the processor includes an auto-focus imaging processor, the auto-focus imaging processor is configured to execute stored instructions, as well as be in communication with a memory that stores instructions that are executable by the auto-focus imaging processor.

19. The non-transitory computer readable storage medium of claim 13, wherein the coarse position of each distributed receiver of the set of distributed receivers corresponds to a range position, such that the range position is a shape of a circle with a center location of the circle positioned at a location of the at least one target, and a radius distance of the circle is a distance from the center of the circle to the coarse position, wherein the unknown position perturbations is a azimuth discrepancy between a perturbed antenna that is a location of the distributed receiver and an ideal position corresponding to a nearest point of a perimeter of the circle from the distributed receiver.

20. A system for fusing a radar image in response to radar pulses transmitted to a region of interest (ROI), and a transmitter of a distributed receiver from a set of distributed receivers transmits the radar pulses toward the ROI, and the set of distributed receivers receive a set of reflections from at least one target located in the ROI, each distributed receiver communicates to a ground central controller, the received reflections and a coarse location, wherein the coarse position includes unknown position perturbations, the system comprising:

a memory to store the received set of reflections from the ROI corresponding to the transmitted radar pulses;

the ground central controller operatively connected to the memory is configured to:

receive the set of reflections from at least one target located in the ROI, each reflection is recorded by each distributed receiver from the set of distributed receivers at a corresponding time and at a corresponding coarse location;

align the set of reflections on a time scale using the corresponding coarse locations of the set of distributed receivers to produce a time projection of the set of reflections for the at least one target;

fit a line into data points formed from radar pulses in the set of reflections received from the set of distributed receivers;

determine for each distributed receiver of the set of distributed receivers a distance between the fitted line and each data point, wherein the distance correlates to the unknown position perturbations;

adjust each coarse position of the set of distributed receivers using the corresponding distance between the fitted line and each data point, to generate an image having a focus greater than the image generated with the coarse position; and fuse the radar image using the set of reflections received at the adjusted coarse position of the set of distributed receivers.

21. The system of claim 20, wherein each distributed receiver in the set of distributed receivers is moving and randomly distributed at a same side of the at least one target.

22. The method of claim 20, wherein each distributed receiver in the set of distributed receivers has a random orientation within a predetermined angular range, with respect to the at least one target.

23. The system of claim 20, wherein the fused radar image is a high resolution two-dimensional (2D) radar image, wherein the high resolution 2D radar image corresponds to the radar reflections that are aligned in time, and add up spatially at the at least one target position to form a focused image of the at least one target.

24. The system of claim 20, wherein the coarse position of each distributed receiver of the set of distributed receivers corresponds to a range position, such that the range position is a shape of a circle with a center location of the circle positioned at a location of the at least one target, and a radius distance of the circle is a distance from the center of the circle to the coarse position, wherein the unknown position perturbations is a azimuth discrepancy between a perturbed antenna that is a location of the distributed receiver and an ideal position corresponding to a nearest point of a perimeter of the circle from the distributed receiver.

* * * * *